United States Patent
Wolf

(10) Patent No.: US 11,731,488 B2
(45) Date of Patent: *Aug. 22, 2023

(54) VENTILATION DEVICE

(71) Applicant: Mahle International GmbH, Stuttgart (DE)

(72) Inventor: Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 283 days.

This patent is subject to a terminal disclaimer.

(21) Appl. No.: 17/120,115

(22) Filed: Dec. 12, 2020

(65) Prior Publication Data

US 2021/0178858 A1 Jun. 17, 2021

(30) Foreign Application Priority Data

Dec. 13, 2019 (DE) .......................... 102019219536.9

(51) Int. Cl.
*B60H 1/00* (2006.01)
*B60H 1/34* (2006.01)

(52) U.S. Cl.
CPC ..... *B60H 1/00864* (2013.01); *B60H 1/00007* (2013.01); *B60H 1/00028* (2013.01); *B60H 1/00057* (2013.01); *B60H 1/00871* (2013.01); *B60H 2001/00178* (2013.01); *B60H 2001/3485* (2013.01)

(58) Field of Classification Search
CPC ............ B60H 1/00007; B60H 1/00028; B60H 1/00042; B60H 2001/00092; B60H 1/00057; B60H 1/00692; B60H 1/00857; B60H 1/00835

USPC .................................................... 454/69–165
See application file for complete search history.

(56) References Cited

U.S. PATENT DOCUMENTS

| 6,609,389 | B2 | 8/2003 | Ozeki et al. |
| 7,950,444 | B2* | 5/2011 | Masatsugu ......... B60H 1/00842 454/126 |
| 10,131,199 | B2 | 11/2018 | Nakao |
| 10,144,267 | B2 | 12/2018 | Richter et al. |
| 2001/0008148 | A1 | 7/2001 | Ito et al. |

(Continued)

FOREIGN PATENT DOCUMENTS

| DE | 60115828 T2 | 7/2006 |
| DE | 112013001895 T5 | 12/2014 |

(Continued)

*Primary Examiner* — Ko-Wei Lin
(74) *Attorney, Agent, or Firm* — Fishman Stewart PLLC

(57) ABSTRACT

A ventilation device may include a housing, a fluid channel system, a heat exchanger, and a slider arrangement. The slider arrangement may include at least one first slider and at least one second slider arranged within the fluid channel system upstream of the heat exchanger and downstream of the heat exchanger respectively. The first and second slider may be guidable transversely with respect to at least one fluid flow. The first and second slider may each be actuatable. At least one of a volume flow and a mass flow of at least one fluid flow may be at least one of controllable and regulatable via actuation of the first slider. At least one of a predetermined fluid temperature and a predeterminable fluid temperature of a mixed fluid may be settable and at least two fluids may be mixable via actuation of the second slider.

24 Claims, 8 Drawing Sheets

(56) References Cited

U.S. PATENT DOCUMENTS

Figure 1A:
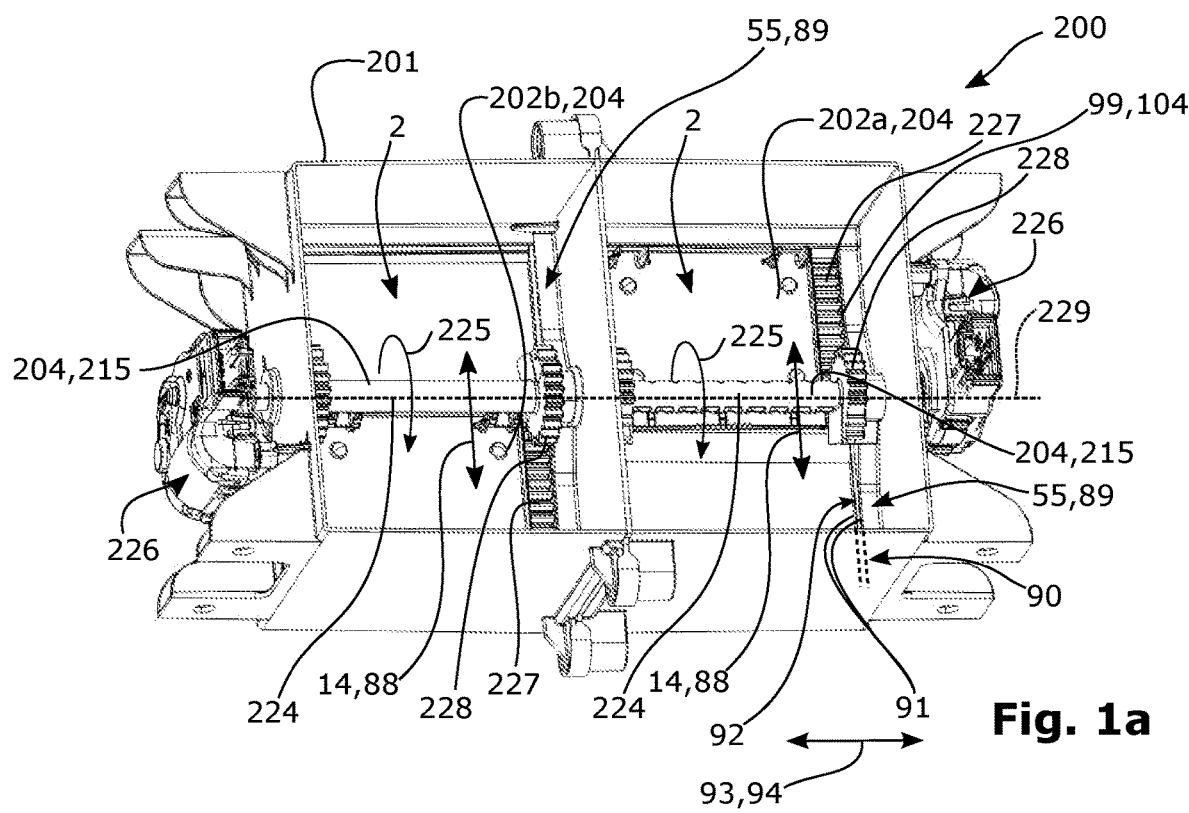

| | | | |
|---|---|---|---|
| 2011/0197516 A1* | 8/2011 | Monoi | B60H 1/00692 49/425 |
| 2012/0122387 A1* | 5/2012 | Nicola | B60H 1/3428 454/155 |
| 2013/0160271 A1* | 6/2013 | Krietzman | H05K 7/20745 29/428 |
| 2013/0319630 A1* | 12/2013 | Yamamoto | B60H 1/00764 165/42 |
| 2015/0283873 A1* | 10/2015 | Suzuki | B60H 1/00692 165/202 |
| 2016/0001630 A1* | 1/2016 | Nakao | B60H 1/00692 236/13 |
| 2016/0082807 A1* | 3/2016 | Richter | B60H 1/0005 454/160 |
| 2016/0229258 A1* | 8/2016 | Loup | B60H 1/00564 |
| 2018/0072131 A1* | 3/2018 | Lee | B60S 1/023 |
| 2019/0077213 A1* | 3/2019 | Kato | B60H 1/00064 |
| 2019/0270359 A1* | 9/2019 | Kato | B60H 1/00028 |
| 2019/0315191 A1* | 10/2019 | Kang | B60H 1/00857 |
| 2019/0351738 A1* | 11/2019 | Wisniewski | B60H 1/00692 |
| 2019/0366794 A1* | 12/2019 | Agathocleous | B60H 1/00485 |
| 2020/0130459 A1* | 4/2020 | Hur | B60H 1/00528 |

FOREIGN PATENT DOCUMENTS

| | | |
|---|---|---|
| DE | 112014000912 T5 | 11/2015 |
| DE | 102014113471 A1 | 3/2016 |

* cited by examiner

VENTILATION DEVICE

CROSS-REFERENCE TO RELATED APPLICATIONS

This application claims priority to German Patent Application No. DE 10 2019 219 536.9, filed on Dec. 13, 2019, the content of which is hereby incorporated by reference in its entirety.

TECHNICAL FIELD

The invention relates to a ventilation device, in particular an air conditioning device, expediently a HVAC air conditioning device, for a road motor vehicle, preferably for an electrically drivable road motor vehicle.

BACKGROUND

A ventilation device, which in specialist circles is also known under the acronym HVAC air conditioning device or HVAC air conditioner or HVAC air conditioning system, is preferably used in the automotive sector for the ventilating or respectively air conditioning of a motor vehicle interior of a road motor vehicle or in the private sector for the ventilating or respectively air conditioning of a living space. The common abbreviation "HVAC" in specialist circles designates here a "Heating-Ventilating and Air Conditioning Device", in German for instance a "Heizungs-Lüftungs- and Klimavorrichtung", therefore a device for the conditioning of, for example, indoor air. The term "conditioning" means in this context that the temperature, humidity, purity and the composition of, for example, indoor air is able to be controlled or regulated.

The known ventilation devices routinely have a fluid channel system which has a cold channel for the directing of a cold fluid flow of cold fluid, a hot channel for the directing of a hot fluid flow of hot fluid, and a mixed channel for the directing of mixed fluid. The cold fluid is temperature-controlled to be relatively cold compared to the hot fluid. In order to meet the temperature requirements on the part of the user, provision is usually made to provide the mixed fluid by mixing the cold fluid flow with the hot fluid flow according to user preferences. For the mixing, routinely so-called sliders are used, which allow the volume proportion of the cold fluid flow from the cold channel and the volume proportion of the hot fluid flow from the hot channel to be set at the provided mixing fluid volume. Thereby, as a result, optionally a relatively hot or cold temperature-controlled mixed fluid can be provided, which is then streamed for example via ventilation openings into a motor vehicle interior of a road motor vehicle. The sliders are preferably actuated respectively by a pinion shaft which is rotatably mounted and drivable in a housing of the ventilation device, for example it is usual to provide an activatable actuator on the housing which is drivingly coupled with the pinion shaft.

As is generally usual in the automotive sector and in the private sector, design solutions which are optimized with regard to lightweight construction and installation space are also required in the field of ventilation devices, in order to generate economic advantages.

SUMMARY

Proceeding from this problem, the object of the invention lies in providing an improved or at least a different embodiment for a ventilation device.

In the present invention this problem is solved in particular by the subject matter of the independent claim(s). Advantageous embodiments are the subject matter of the dependent claim(s) and the description.

The basic idea of the of the present invention lies in equipping a ventilation device with several sliders which are respectively optimized constructionally according to functional standpoints. The optimized sliders generate the advantageous effect that, compared to the ventilation devices known hitherto, volume- and/or mass flows of the fluid flows flowing through the ventilation device can be set, in particular regulated or controlled, more precisely. In particular, the advantage can thereby be achieved that a fluid flow which is able to be tapped on the part of the user corresponds to a predetermined or predeterminable fluid temperature or follows a predetermined or predeterminable fluid temperature profile more rapidly and more precisely than possible hitherto.

For this, provision is made that the ventilation device is equipped with a housing which has a fluid channel system of a cold channel for the directing of a cold fluid flow of cold fluid, of a hot channel for the directing of a hot fluid flow of hot fluid, and of a mixed channel for the directing of a mixed fluid flow of mixed fluid, provided from cold fluid and/or hot fluid. The housing can also serve here for the protection of components of the ventilation device, in particular for protection from interferences which act from outside the housing, for example dirt and/or intrusive fluid and/or electromagnetic radiation. Expediently, the housing can form or delimit a single-chambered or multi-chambered installation space, wherein in the interior of the installation space components of the ventilation device and expediently the fluid channel system can be received in a house-like manner, in particular can be loosely inserted temporarily or fixedly arranged practically permanently. On the housing, components and/or the fluid channel system of the ventilation device can be positioned and/or fixed on the housing from inside the housing and/or from outside the housing in a touching manner, in particular in a materially bonded, force-fitting and/or form-fitting manner. For example, the housing has suitable positioning arrangements and/or fixing arrangements for this, by way of example bearing sites and/or fixing points. The housing, which is configured in particular having one part or several parts, is expediently formed from at least one housing wall or from several housing walls which are cohesive, in particular in a materially bonded manner. When the housing is formed from a single housing wall, this concerns expediently a cylinder housing which is rotationally symmetrical with respect to a rotation axis, for example a circular cylinder housing, a cone cylinder housing or a frustum cylinder housing. If the housing is formed from several housing walls which are cohesive, in particular in a materially bonded manner, this can concern expediently a cuboid-like housing box or a housing box which is configured in a complex manner. In any case, the housing can be formed from a plastic, a metal material or a composite material and in particular can be produced at a favourable cost within a production method which is suitable for the respective material.

Within or completely within or in the region of the fluid channel system, a heat exchanger for the cooling and/or heating of cold fluid and/or of hot fluid and/or of mixed fluid is arranged in a manner able to be washed around with fluid, fixedly on the fluid channel system, in particular within the cold channel on a wall of the cold channel or within the hot channel on a wall of the hot channel or within the mixed channel on a wall of the mixed channel Practically, the heat exchanger can be configured to be electrically operable and supplied via corresponding electrical contacts with electrical energy originating from a supply arrangement of the ventilation device. Furthermore, the heat exchanger can be controlled by means of a control arrangement of the ventilation device, in particular according to predetermined ventilation wishes on the part of the user.

The ventilation device has, furthermore, a slider arrangement which has at least one first slider arranged upstream with respect to the heat exchanger, in particular completely within, within the fluid channel system on the fluid channel system, in particular within the cold channel on a wall of the cold channel or within the hot channel on a wall of the hot channel or within the mixed channel on a wall of the mixed channel, and transversely with respect to the cold fluid flow and/or the hot fluid flow and/or the mixed fluid flow in a manner which is able to be guided movably, and at least one second slider arranged downstream with respect to the heat exchanger, in particular completely within, within the fluid channel system on the fluid channel system and transversely with respect to the cold fluid flow and/or the hot fluid flow and/or the mixed fluid flow in a manner which is able to be guided movably. Each slider is able to be actuated respectively within a slider movement in a slider movement direction oriented transversely or substantially transversely with respect to the cold fluid flow and/or the hot fluid flow and/or the mixed fluid flow. This has the effect that by means of the first slider a volume flow or a mass flow of one or more of the fluid flows, in particular the cold fluid flow and/or the hot fluid flow and/or the mixed fluid flow, is to be controlled or regulated through the fluid channel system. This has the effect, furthermore, that by means of the second slider a predetermined or predeterminable fluid temperature of the mixed fluid is adjustable by mixing of cold fluid and/or hot fluid and/or mixed fluid. Hereby, advantageously a fluid flow which is able to be tapped on the part of the user is adapted more rapidly and more precisely than hitherto possible to a predetermined or predeterminable fluid temperature or a predetermined or predeterminable fluid temperature profile.

The first slider can be arranged movably within the cold channel on a wall of the cold channel or within the hot channel on a wall of the hot channel or within the mixed channel on a wall of the mixed channel, in particular in a guidable manner. The second slider can be arranged movably within the cold channel on a wall of the cold channel or within the hot channel on a wall of the hot channel or within the mixed channel on a wall of the mixed channel, in particular in a guidable manner That has the advantageous effect that the sliders can respectively come in contact directly, in a touching manner, with the fluid flowing through the ventilation device, in order to interact with the fluid in a flow-influencing manner.

A single one, or both, sliders can be moved in particular independently of one another, within a slider movement. Preferably, for this purpose respectively a pinion shaft is associated with a slider.

Furthermore, at least one of the two, or all, sliders can be respectively mounted by means of a guide arrangement arranged on the fluid channel system, in particular within the cold channel on a wall of the cold channel or within the hot channel on a wall of the hot channel or within the mixed channel on a wall of the mixed channel, relative to the fluid channel system and or the housing, in a guidable manner. This has the advantageous effect that the sliders are able to be moved relatively easily, for example by means of an actuator, within a slider movement.

The ventilation device can have expediently a first slider, in particular also designated as forward flow slider, which has or forms a slider body.

In particular, the slider body of the first slider can be made from a plastic or from a metal material or a composite material.

Further in particular, the slider body of the first slider can be of square plate-shaped or rectangular plate-shaped configuration or flat shape. The term flat shape can mean that the slider body is configured to be thin in the manner of a metal sheet. Expediently, the slider body is configured to be relatively thin compared to a second slider body of the second slider, so that the slider body of the first slider could be designated as "thin slider".

The slider body of the first slider can extend along two body axes, aligned in an angled manner, in particular at right angles, to one another, in longitudinal direction and in width direction, wherein the slider body extends in vertical direction along a body vertical axis aligned at right angles to the two body axes. The slider body can be configured here narrower in vertical direction than in longitudinal direction and width direction. In particular, the slider body is only a few millimetres or fractions of a millimetre thick in vertical direction, whereas it is several millimetres thick in longitudinal direction and width direction.

The slider body of the first slider can have, furthermore, four margin vertical edges aligned parallel or substantially parallel with respect to the body vertical axis. The margin vertical edges are connected to one another via margin longitudinal edges aligned respectively parallel or substantially parallel to the body axes. In particular an edge can be formed between two faces which are touching one another.

Expediently, respectively two immediately adjacent margin vertical edges can be configured jointly with respect to the body axes in a bent, hemispherical or angular manner, in particular a C-shaped or U-shaped configuration can be realized. The slider body of the first slider can thereby have respectively an arched edge on two sides which are opposed to one another. This has the effect that a controlling or regulating of a volume flow or of a mass flow of the fluid flows which are to be controlled or regulated is advantageously assisted.

Furthermore, the slider body of the first slider can have a free, circumferential and flat cohesive edge. The edge can form a honeycomb-like reinforcement or a labyrinth edge, so that the slider body of the first slider is reinforced against external stresses and is therefore less deformable. Furthermore, the edge can form or have a multiplicity or a plurality of honeycomb-like or box-like reinforcement elements which serve respectively for the reinforcing of the slider body.

The slider arrangement can have a pinion shaft, drivable rotationally around its longitudinal axis in circumferential direction, arranged in a touching manner on the first slider, for actuating the first slider within the slider movement. The slider body can have here an actuation arrangement which is able to be brought into touching engagement with a counter-actuation arrangement of the pinion shaft.

Expediently, within the slider movement, the first slider can be actuated to and fro between a hot position, a cold position and at least one intermediate position. In the hot position, the first slider can block, in particular completely, the cold fluid flow of cold fluid, so that expediently no fluid flows past it. In the cold position, the first slider can block the hot fluid flow of hot fluid, so that expediently here also no fluid flows past it. Lastly, in one of the intermediate positions, the first slider can block the cold fluid flow of cold fluid and the hot fluid flow of hot fluid respectively partially. This has the effect as a whole that by means of the first slider a volume flow or a mass flow of one or more of the fluid flows which flow through the fluid channel system, is able to be controlled or regulated.

The second slider, in particular also designated as reverse flow slider, forms, like the first slider, expediently a slider body. The slider body of the second slider can be produced from a plastic or from a metal material or a composite material.

Furthermore, the slider body of the second slider can be of square plate-shaped or rectangular plate-shaped or trapezoidal configuration or flat shape. This has the effect that a suitability for injection moulding production of the second slider is improved, but at least assisted, so that the slider body of the second slider can be produced more easily and/or more quickly within an injection moulding process.

The slider body of the second slider can extend in longitudinal direction and width direction along two body axes which are aligned in an angled, in particular right-angled, manner to one another, wherein the slider body extends in vertical direction along a body vertical axis which is aligned at right angles to the two body axes. Here, the slider body can be configured to be narrower in vertical direction than in longitudinal direction and width direction. In particular, the slider body is only a few millimetres thick in vertical direction, whereas it is several millimetres thick in the longitudinal direction and width direction.

The slider body of the first slider can have, furthermore, four margin vertical edges which are aligned in a parallel manner or substantially parallel manner with respect to the body vertical axis. The margin vertical edges are connected to one another via margin longitudinal edges which are aligned respectively parallel or substantially parallel to the body axes. It has been found that it is advantageous: to configure a single margin vertical edge to be shorter in vertical direction than the remaining margin vertical edges, furthermore to configure a single margin vertical edge to be longer in vertical direction than the remaining margin vertical edges, furthermore to configure two margin vertical edges to be of equal length in vertical direction or respectively longer in vertical direction than the shortest margin vertical edge, and respectively shorter in vertical direction than the longest margin vertical edge. Thereby a slider body geometry is defined which has the advantageous effect of assisting a suitability for injection moulding production of the second slider, so that in particular the production suitability of the slider body of the second slider is improved.

In any case, the slider body of the second slider can have a free circumferential and flat cohesive edge. The latter can form a honeycomb-like reinforcement or a labyrinth edge, in order to reinforce the slider body of the second slider against external stresses, so that that the slider body of the second slider is reinforced against external stresses and is therefore less deformable. The edge can have, furthermore, a plurality of honeycomb-like or box-like reinforcement elements for the reinforcing of the slider body.

Within the slider movement for setting a predetermined or predeterminable temperature of the mixed fluid by mixing the fluid flows, the second slider can be actuated to and fro between a first mixed position, a second mixed position and at least one intermediate mixed position, for instance like a temperature mixer valve. Here, the second slider in the first mixed position can close a cold orifice opening area of the cold channel in a fluid-tight manner, so that hot fluid flows out of the hot channel into the mixed channel. Furthermore, the second slider in the second mixed position can close a hot orifice opening area of the hot channel in a fluid-tight manner, so that cold fluid flows out from the cold channel into the mixed channel. In at least one or all intermediate mixed positions of the second slider, the second slider is actuated between the first and second mixed position, so that the second slider closes a predeterminable or predetermined area portion of the cold orifice opening area and a predeterminable or predetermined area portion of the hot orifice opening area. This has the effect that as a whole, fluid flows are mixed with one another in order to be able to provide on the part of the user a mixed fluid with a predetermined or predeterminable temperature.

Again for both sliders, it is of interest that the heat exchanger of the ventilation device can be formed by an in particular electrically operable heat-generating arrangement which is formed for the emitting or transferring of thermal energy, in particular to one of the fluids, in order to heat a fluid flowing through the fluid channel system. Furthermore, the heat exchanger can be formed by an in particular electrically operable cold-generating arrangement, which is formed for the receiving of thermal energy, in particular from one of the fluids, in order to cool a fluid flowing through the fluid channel system. In order to combine the advantages of the two arrangements with one another, provision can be made that the heat exchanger is formed by an in particular electrically operable temperature control arrangement, which is formed for the emitting and receiving of thermal energy, in particular from one of the fluids, in order to optionally heat or cool a fluid flowing through the fluid channel system.

As mentioned, the ventilation device can be equipped with at least one guide arrangement for guiding respectively one of the two sliders within the slider movement. The guide arrangement can have a pair of guide strips, assigned respectively to a single slider, which are arranged lying opposite one another on the fluid channel system or on a wall of the fluid channel system or on the housing of the ventilation device. Expediently, a guide strip is formed from a pair of longitudinal ribs which in turn are spaced apart transversely from one another at least in sections with respect to their respective rib longitudinal axes and which are aligned parallel to one another with respect to their respectively rib longitudinal axis, and which are fixedly arranged on the fluid channel system or on a wall of the fluid channel system or on the housing. The longitudinal ribs can form, transversely with respect to the rib longitudinal axes, between them a clear slider edge receiving space. Expediently, in order to realize the slider movement of the respective slider, at least two edge portions of the respective slider interact with the guide strips. In particular, respectively a single edge portion of the respective slider is inserted in a sandwich-lie manner in a single slider edge receiving space of a guide strip on both sides touching the longitudinal ribs in a dipping manner, so that the respective slider is able to be guided in a touching manner and free of play. Thereby, a transverse play of a slider relative to the fluid channel system can be blocked in transverse direction to the slider movement direction.

On the first and/or second slider, a pinion shaft, which is drivable rotationally in circumferential direction about its longitudinal axis, can be arranged respectively in a touching manner, in order to actuate the respective slider within the slider movement. The pinion shaft can be equipped with a counter-actuation arrangement, which is able to be brought in a touching manner in engagement with the first and/or second slider body.

One or both sliders can have an actuation arrangement, interacting with a counter-actuation arrangement arranged on a pinion shaft, for actuating the respective slider within the slider movement. Here, the actuation arrangement can have at least one longitudinal tooth row, which has teeth lined up adjacent to one another in a touching manner in a tooth longitudinal axis. The longitudinal tooth row can be arranged on or in the region of an edge or an edge portion and can be aligned parallel, in particular substantially parallel, to the respective edge or to the respective edge portion. Accordingly, the counter-actuation arrangement can have counter-teeth.

Furthermore, provision can be made that at least one longitudinal tooth row, in operation of the ventilation device, dips at least in sections into the slider edge receiving space. Here, at least one tooth can lie against a longitudinal rib in touching manner.

A single slider, or all sliders, can have a slider body which extends respectively with the formation of two large slider areas aligned in opposition to one another along two body axes aligned at right angles to one another in longitudinal direction and width direction. The respective slider body extends expediently furthermore along a body vertical axis aligned at right angles to the body axes in vertical direction, wherein the respective slider body has an externally circumferential free end face connecting the large slider areas with one another. On one large slider area, two longitudinal tooth rows can be arranged, the tooth longitudinal axes of which are aligned parallel, in particular substantially parallel to one another. The tooth longitudinal rows can be arranged with transverse distance to one another with respect to their tooth longitudinal axes, wherein the tooth longitudinal rows are preferably arranged on or in the region of opposite edge portions of the respective slider body, and wherein each tooth longitudinal row lies in a touching manner with all teeth in a touching manner on a longitudinal rib of the guide arrangement.

The teeth can form tooth crests and tooth troughs arranged alternating with respect to one another in the direction of the tooth longitudinal axis. On a single one or on each or on every other tooth crest of a tooth at least one protuberance element can be arranged. A protuberance element can respectively project away from the tooth in a projection-like manner transversely to the slider movement direction or transversely to a large slider area or transversely to one of the body axes or in the direction of the body vertical axis.

In the operation of the ventilation device, at least one protuberance element can be inserted in a dipping manner at least partially into the slider edge receiving space, in order to lie in a touching manner against a longitudinal rib. In this context, it can be imagined that at least one single or alternatively each protuberance element is arranged integrally on the respective tooth, or that at least one single protuberance element is formed by a hemispherical body, or that at least one protuberance element lies against a longitudinal rib, touching in a punctiform, linear or flat manner.

Through the protuberance elements, a transverse play can be set between slider and guide arrangement, whereby for example a "rattling" of the slider can be suppressed. For this reason, it is also desirable and advantageous if a protuberance element is expediently configured so that, in operation of the ventilation device, it dips at least partially into the slider edge receiving space and lies against a longitudinal rib in a touching manner By way of example, a protuberance element can be arranged or formed integrally on the respective tooth and be realized here as a hemispherical body. It is preferred if a protuberance element comes to abut with a longitudinal rib, touching in a punctiform, linear or flat manner.

It can be imagined that the protuberance element is produced from plastic material or from a composite material and that the rib longitudinal axes and the slider movement direction are aligned parallel to one another, in particular substantially parallel to one another.

A further basic idea of the invention can lie in providing sliders for a ventilation device. Corresponding sliders for a ventilation device, in particular an air conditioning device, expediently an HVAC air conditioning device for a road motor vehicle, preferably for an electrically drivable road motor vehicle, can be equipped respectively with a slider body which extends, with the formation of two large slider areas aligned opposed to one another, along two body axes, aligned at right angles to one another, along the length and width, and which extends vertically along a body vertical axis which is aligned at right angles to the body axes. The slider body can have, furthermore, an externally circumferential free end face connecting the large slider areas with one another. On the slider body or on one of its large slider areas, two separate longitudinal tooth rows can be arranged, wherein each longitudinal tooth row has teeth, lined up adjacent to one another in a touching manner in the direction of a tooth longitudinal axis. Each longitudinal tooth row can be arranged on or in the region of an edge or an edge portion of the respective slider and can be aligned parallel, in particular substantially parallel, to the respective edge or to the respective edge portion. The tooth longitudinal axes of the longitudinal tooth rows can be aligned parallel, in particular substantially parallel, to one another, but also in an angled manner. In any case, it can prove to be advantageous if the longitudinal tooth rows are arranged with respect to their tooth longitudinal axes with respect to one another with a transverse distance on the respective slider. Here, the tooth longitudinal rows can be arranged on or in the region of opposite edge portions. Furthermore, the respective slider can have at least one protuberance element, which is arranged on one or on each tooth of a longitudinal tooth row, in particular in a materially bonded manner. The protuberance elements offer the advantage, in particular, that the transverse play between the sliders and the guide arrangement can be set relatively easily, whereby undesired intrusive noises during operation of the ventilation device can be prevented.

A further basic idea of the invention, which is able to be realized additionally or optionally to the above idea, consists in providing a ventilation device, in particular an air conditioning device, expediently an HVAC air conditioning device, for a road motor vehicle, preferably for an electrically drivable road motor vehicle, which is equipped with a fluid channel system. The fluid channel system can have at least one cold channel for the directing of a cold fluid flow of cold fluid, for example air, at least one hot channel for the directing of a hot fluid flow of hot fluid, for example air, and at least one mixed channel, for the directing of a mixed fluid flow of mixed fluid. The mixed fluid, for example air, is provided from cold fluid and/or hot fluid. The ventilation device can have, furthermore, a slider arrangement for the provision of mixed fluid of cold fluid and/or hot fluid, which comprises at least one slider which, within a slider movement, is actuatable to and fro in particular between a hot position, a cold position and at least one intermediate position. The slider arrangement can have, furthermore, a pinion shaft, drivable rotationally about its axial longitudinal axis, arranged expediently on the at least one slider in a touching manner, which serves for the actuating of the at least one slider within the slider movement. For example, the pinion shaft is drivable rotationally by means of an actuator. The ventilation device can have, furthermore, a clamping arrangement, by means of which a clamping to one another of a slider and pinion shaft is able to be realized, in particular can securely clamp slider and pinion shaft to one another in a touching and detachable manner within the slider movement, for example in the hot position or in the cold position. This can offer the advantage that in operation of the ventilation device expediently in the hot position and/or in the cold position, a relative movement between the slider and the pinion shaft, possibly bringing about intrusive noises, can be prevented. The ventilation device can therefore be configured as a whole to be operable relatively free of intrusive noise. Furthermore, the clamping arrangement can be used for the economical optimization of a mounting method for mounting the slider arrangement of the ventilation device in a housing of the ventilation device. For this, one makes use of the fact that the slider and pinion shaft in the unmounted state can be clamped securely to one another by means of the clamping arrangement, so that they form, as it were, a slider-pinion shaft component. The slider-pinion shaft component can then be moved within the mounting process as a cohesive unit, for example into a predetermined or predeterminable installation position within a housing of the ventilation device.

Expediently, the clamping device has a clamping element arranged on the slider and a counter-clamping element arranged on the pinion shaft. It is preferred here if the clamping element and the counter-clamping element are configured in a complementary manner, so that they can clamp to one another with a clamping effect. Further expediently, the clamping element and the counter-clamping element can be securely clamped to one another in a detachable manner, when they engage into one another in a touching manner in a form- and/or force fit under elastic widening of the clamping element or under elastic widening of the counter-clamping element.

In order to realize the clamping with favourably priced means, the clamping element can have a pair of clamping fingers, or the counter-clamping element can have a pair of clamping fingers. The clamping fingers of a clamping element can protrude here respectively from the slider in an angled manner, in particular at right angles. The individual clamping fingers can describe here an individual angle between them and the slider. Alternatively, all the clamping fingers can respectively describe the same angle between them and the slider. Furthermore, at least one clamping finger can be arranged integrally on the slider, therefore in one piece. The slider can then be produced for example in an injection moulding process, which is desirable especially from a financial point of view.

Furthermore, at least two clamping elements, spaced apart from one another, can define between them an in particular straight or curved equipping axis, along which at least two clamping fingers are lined up adjacent to one another with a reciprocal spacing. The equipping axis can be oriented here parallel, in particular substantially parallel, to the longitudinal axis. It is possible, furthermore, that two or more equipping axes are defined, which are oriented parallel to one another and respectively parallel, in particular substantially parallel, to the longitudinal axis, wherein along each equipping axis at least two clamping fingers of a clamping element are lined up adjacent to one another with reciprocal distance. Thereby, as it were, an entire row of clamping elements can be provided, whereby as a whole the clamping function of the clamping arrangement is improved.

Furthermore, it is conceivable that the clamping fingers of a counter-clamping element protrude respectively in an angled manner, in particular at right angles, from the pinion shaft. In this context, one can also imagine that the clamping fingers are arranged integrally on the pinion shaft, so that for the production of the pinion shaft, as in the case of the slider, an injection moulding process presents itself, in order to be able to meet financial design wishes.

In any case, one or each clamping finger can have a continuously constant finger cross-section with respect to its axial main axial extent, in particular the finger cross-section is aligned transversely to the axial main axial extent. By way of example, the finger cross-section can be of round, oval or polygonal shape.

Furthermore, it has been found that the clamping element can have at least one clamping body or alternatively that the counter-clamping element can have at least one clamping body, which are provided to interact in a clamping manner with respectively two or more clamping fingers. Here, the clamping bodies expediently protrude from the slider in an angled manner, in particular at right angles, if they are arranged as a clamping element on the slider. Alternatively, the clamping bodies protrude as counter-clamping element from the pinion shaft in an angled manner, in particular at right angles, with respect to the longitudinal axis. Here, it is advantageous from the point of view of mechanical stability and producibility if the clamping bodies are arranged respectively integrally on the pinion shaft and/or on the slider.

The clamping bodies can be equipped with an entirely continuously constant clamping body cross-section with respect to their respective main extent. The clamping body cross-section is in particular of round, oval or polygonal shape here. One can also imagine that the clamping body has a continuously constant T-shaped T-clamping body cross-section with respect to its main extent.

Furthermore, the clamping body can have a base body part and a centring projection arranged thereon for the elastic widening of clamping fingers of a clamping element or counter-clamping element. The centring projection serves preferably for the centring of the clamping element or of the counter-clamping element relative to the counter-clamping element or clamping element. Preferably, the centring projection has a pair of insertion slope faces, aligned to one another in an angled, in particular acute-angled, manner. On the base body part, two lateral projections can be arranged which protrude to one side of the base body part in an angled manner, in particular at right angles, from the base body part. The lateral projections can furthermore serve respectively as a stop for a clamping finger.

Between the clamping fingers, a clear intermediate clamping gap can be formed, into which the clamping finger is able to be inserted under widening of the intermediate clamping gap and under elastic deflection of the clamping fingers for the clamping of slider and pinion shaft to one another.

A further idea of the invention, which is able to be realized additionally or optionally to the above idea, consists in providing a mounting method for ventilation devices. Within the mounting method for mounting a slider arrangement of a ventilation device in a housing of a ventilation device, firstly provision can be made to provide a ventilation device as follows:

with a housing and a fluid channel system of a cold channel for the directing of a cold fluid flow of cold fluid, a hot channel for the directing of a hot fluid flow of hot fluid and a mixed channel for directing a mixed fluid flow of mixed fluid provided from cold fluid and/or hot fluid, with a slider arrangement for the providing of mixed fluid of cold fluid and/or hot fluid, wherein the slider arrangement has at least one slider, which within a slider movement is able to be actuated to and fro between a hot position, a cold position and at least one intermediate position, wherein the slider arrangement has a pinion shaft, drivable rotationally in circumferential direction about its longitudinal axis, arranged on the slider in a touching manner, for actuating the slider within the slider movement, wherein the ventilation device has a clamping arrangement for the touching, detachable clamping of slider and pinion shaft to one another, wherein the clamping arrangement has a clamping element arranged on the slider and a counter-clamping element arranged on the pinion shaft. The mounting method can comprise the following steps:

1) Within a preparation step for mounting, the slider and the pinion shaft are detachably clamped to one another in a touching manner by means of the clamping arrangement, so that the slider and the pinion shaft are not detachable from one another unintentionally, 2) Mounting of the unit of slider and pinion shaft in or on the housing of the ventilation device, 3) Releasing of the clamping between slider and pinion shaft, so that the slider is actuatable by means of the pinion shaft within the slider movement.

A further idea of the invention, which is able to be realized additionally or optionally to the above idea, consists in providing a method for operating a ventilation device. A ventilation device for this purpose can have the following:

a housing and a fluid channel system of a cold channel for the directing of a cold fluid flow of cold fluid, a hot channel for the directing of a hot fluid flow of hot fluid and a mixed channel for the directing of a mixed fluid flow of mixed fluid provided from cold fluid and/or hot fluid, a slider arrangement for the providing of mixed fluid of cold fluid and/or hot fluid, which has at least one slider, which within a slider movement is actuatable to and fro between a hot position, a cold position and at least one intermediate position, wherein the slider arrangement has a pinion shaft, drivable rotationally in circumferential direction about its longitudinal axis, arranged in a touching manner on the slider, for actuating the slider within the slider movement, wherein the ventilation device has a clamping arrangement for the touching, detachable clamping to one another of slider and pinion shaft, wherein the clamping arrangement has a clamping element arranged on the slider and a counter-clamping element arranged on the pinion shaft, preferably comprising the steps:

1) Actuating the slider by means of the pinion shaft within the slider movement into the hot position or the cold position, wherein the slider and the pinion shaft in the hot position or in the cold position are respectively detachably clamped securely to one another in a touching manner by means of the clamping arrangement, so that the slider and the pinion shaft in the respective position are not detachable from one another unintentionally, 2) Actuating the slider by means of the pinion shaft within the slider movement into one of the intermediate positions, wherein the clamping arrangement is released.

A further basic idea of the invention, which is able to be realized additionally or optionally to the above idea, can lie in counteracting an intrusive noise development, caused inter alia by weight optimization, on or through the slider and/or on or through the pinion shaft in operation of the ventilation device by means of a blocking arrangement, as it were an acoustic blocking arrangement, arranged on a slider or in the region of a slider and/or on the pinion shaft. In operation of the ventilation device, thereby practically no acoustic intrusive noises are generated.

For this, a ventilation device, in particular an air conditioning device, expediently an HVAC air conditioning device, can be provided for a road motor vehicle, preferably for an electrically drivable road motor vehicle, with a fluid channel system. The fluid channel system can have at least one cold channel for the directing of a cold fluid flow of cold fluid, for example air, at least one hot channel for the directing of a hot fluid flow of hot fluid, for example air, and at least one mixed channel for the directing of a mixed fluid flow of mixed fluid. The mixed fluid, for example air, can be provided from cold fluid and/or hot fluid. The ventilation device can have, furthermore, a slider arrangement for the providing of mixed fluid of cold fluid and/or hot fluid, which comprises at least one slider which, within a slider movement, is actuatable to and fro in particular between a hot position, a cold position and at least one intermediate position. The slider arrangement can have, furthermore, a pinion shaft, rotationally drivable in circumferential direction about its axial longitudinal axis, expediently arranged in a touching manner on the slider, which serves for the actuating of the slider within the slider movement. For example, the pinion shaft is rotationally drivable by means of an actuator. The ventilation device can have, furthermore, a blocking arrangement, which is arranged in a sandwich-like manner between the slider and the pinion shaft and defines a sealing gap between the slider and the pinion shaft, which blocks a bypass fluid flow of mixed fluid and/or of cold fluid and/or of hot fluid, in order to prevent or reduce acoustic intrusive noises produced in operation of the ventilation device by the bypass fluid flow on the slider or on the pinion shaft. This offers the advantage that ventilation devices are able to be operated relatively free of intrusive noise, which is of interest in particular in electrically operable road motor vehicles, before there further intrusive noise sources, acting in an acoustically overlaying manner, such as for instance a combustion engine, are absent.

Expediently, the blocking arrangement can have one or more blocking ribs, which are arranged on the slider in a touching manner or a formed integrally on the slider, therefore are embodied in one piece with the slider. A sealing gap is formed between a free rib edge of the blocking rib and the pinion shaft, in particular between a circular-cylindrical stem body of the pinion shaft. Through blocking ribs, a relatively favourably priced way is described to realize a blocking arrangement. Thereby, a blocking arrangement can be realized with economically justifiable expenditure on a ventilation device.

Preferably, the blocking arrangement can have only one or more counter-blocking ribs, which are arranged in a touching manner on the pinion shaft or are formed integrally on the pinion shaft, therefore embodied in one piece with the pinion shaft. In this case, a sealing gap is formed between a free counter-rib edge of the counter-blocking rib and the slider, in particular a flat slider body of the slider.

In particular, the blocking arrangement can have one or more blocking ribs and one or more counter-blocking ribs. Each blocking rib can be arranged in a touching manner on the slider or formed integrally on the slider, therefore embodied in one piece with the slider. Each counter-blocking rib can be arranged, in turn, in a touching manner on the pinion shaft or formed integrally on the pinion shaft, therefore embodied in one piece with the pinion shaft. A sealing gap is expediently formed between a single blocking rib and a single counter-blocking rib, expediently between a free rib edge of the respective blocking rib and a free counter-rib edge of the respective counter-blocking rib.

It is expedient if the blocking arrangement of the ventilation device is equipped with sealing means, in order to cover the formed sealing gap, so that a bypass fluid flow can be practically completely prevented. This has the advantage that no intrusive noises can occur. Expediently, the sealing means can be arranged on the blocking rib, in particular on its free rib edge, or on the counter-blocking rib, again in particular on its free counter-rib edge, in order to expediently seal the sealing gap in a fluid-tight manner.

The sealing means themselves can be formed by an elastic sealing lip. The sealing lip can have a root portion, by means of which the sealing lip is arranged in a touching manner, for example glued on, on the blocking rib, in particular on its free rib edge, or on the counter-blocking rib, in particular on its free counter-rib edge. Furthermore, the sealing lip can have a tongue portion, which is realized for example on an end of the sealing lip opposed to the root portion. The tongue portion can lie in a touching manner on a blocking rib, spaced apart from the root portion, in particular on its free rib edge, or on a counter-blocking rib, spaced apart from the root portion, in particular on its free counter-rib edge, in a touching and gap-free manner, in order to cover the sealing gap, so that a bypass fluid flow can be practically completely prevented. The tongue portion can be configured to be tapering in the direction from the root portion towards its free tongue portion end, in a way that the sealing lip is configured to be relatively thick at the root portion and to be relatively thin at the free tongue portion end of the tongue portion.

Further expediently, provision is made that a blocking rib and/or a counter-blocking rib is formed from a single-piece or multi-part flat body, which expediently has two large areas, oriented opposed to one another, in particular oriented substantially opposed to one another, and one end face which is circumferential and connecting the large areas to one another. Thereby, a possible physical configuration of a blocking rib and/or of a counter-blocking rib is described, wherein of course variant configurations can be imagined. Furthermore, the flat bodies can be produced from a plastic material or from a composite material. Expediently, the flat bodies or respectively the blocking rib and/or a counter-blocking rib are produced from the same material as the slider, namely in particular from a plastic material or a composite material.

In particular, the slider can have a slider body which extends along two body axes aligned at right angles to one another, as it were along the length and width. Here, the slider body can have an externally circumferential free edge, wherein at least one blocking rib and/or one counter-blocking rib is arranged parallel, in particular substantially parallel, or in an angled manner to a section of the edge designated as edge portion on the slider body. It is also conceivable that a blocking rib and/or a counter-blocking rib is arranged parallel, in particular substantially parallel or in an angled manner with respect to one of the body axes.

Expediently, two or more blocking ribs and/or two counter-blocking ribs can be arranged parallel, in particular substantially parallel, to one another.

Furthermore, the opposite large areas of two adjacent blocking ribs and/or of two adjacent counter-blocking ribs can be arranged parallel to one another, in particular substantially parallel, but also in an angled manner to one another.

Furthermore, the slider can have a plate-shaped or cuboid-shaped slider body, which extends along two body axes aligned at right angles to one another, along the length and width, wherein a body plane is spanned between the body axes. The blocking arrangement can comprise at least one blocking rib arranged on the slider body, which protrudes from the slider body in an angled manner, in particular at right angles or transversely, to the body plane.

The blocking arrangement preferably has at least one blocking rib and/or a counter-blocking rib, which is realized as a single-component 1 K component. This has the advantage that a blocking rib and/or a counter-blocking rib can be produced at a relatively favourable cost, for example within an injection moulding process.

It is possible that the blocking arrangement has at least one sawtooth row, which is formed from sawteeth lined up adjacent to one another in a touching manner in a stacking direction. The sawtooth row can be arranged here on or in the region around a circumferential free edge of a slider body of the slider and parallel, in particular substantially parallel, to a blocking rib and/or a counter-blocking rib. In particular, in interaction with a blocking rib and/or a counter-blocking rib, a sawtooth row can contribute to a reduced formation of intrusive noise on the slider, in particular because fluid flowing along the slider is eddied, whereby the fluid flow speeds result in being relatively low and thereby vibration effects on the slider result in being less intensive.

Expediently, in the hot position the slider closes a cold orifice opening area of the cold channel, so that hot fluid can flow out of the hot channel into the mixed channel. In the cold position, the slider closes a hot orifice opening area of the hot channel, so that cold fluid flows out of the cold channel into the mixed channel. Furthermore, in at least one intermediate position between the cold position and the hot position, the slider can close a predeterminable or predetermined area portion, for example indicated in $m^2$, of the cold orifice opening area of the cold channel and a predeterminable or predetermined area portion, for example indicated in $m^2$, of the hot orifice opening area of the hot channel, so that hot fluid can flow out of the hot channel and cold fluid can flow out of the cold channel in a predeterminable or predetermined volume mixture ratio into the mixed channel. Furthermore, the slider can have an actuation arrangement for actuating the slider within the slider movement, for example a pinion shaft or a rack profile or teeth lined up adjacent to each other, wherein on the pinion shaft at least one counter-actuation arrangement, in particular a tooth profile, cooperating in particular with the pinion shaft or with the rack profile, is arranged. The counter-actuation arrangement projects here transversely to the longitudinal axis over the pinion shaft and, in operation of the ventilation device, interacts in a touching manner with the actuation arrangement of the slider for actuating the slider within the slider movement. Here, the pinion shaft, the slider, the actuation arrangement and the counter-actuation arrangement can delimit between them a clear passage into which, proceeding from the slider and/or from the pinion shaft, a blocking rib and/or a counter-blocking rib project with formation of the sealing gap. This has the effect that the clear passage is closed, is sealed as it were. This has the advantage that practically no fluid can flow between the pinion shaft and the slider, whereby an intrusive noise formation is prevented.

A further basic idea of the invention, which is able to be realized additionally or optionally to the above idea, can lie in providing an optimized pinion shaft for a ventilation device. For this, a ventilation device, in particular an air conditioning device, expediently an HVAV air conditioning device, can be provided for a road motor vehicle, preferably for an electrically drivable road motor vehicle, with a fluid channel system. The fluid channel system can have at least one cold channel for directing a cold fluid flow of cold fluid, for example air, at least one hot channel for directing a hot fluid flow of hot fluid, for example air, and at least one mixed channel for directing a mixed fluid flow of mixed fluid. The mixed fluid, for example air, can be provided from cold fluid and/or hot fluid. The ventilation device can have, furthermore, a slider arrangement for the providing of mixed fluid of cold fluid and/or hot fluid, which comprises at least one slider, able to be actuated to and fro within a slider movement, in particular between a hot position, a cold position and at least one intermediate position. The slider arrangement can have a pinion shaft, drivable rotationally in circumferential direction about its axial longitudinal axis, expediently arranged on the slider in a touching manner, which serves for actuating the slider within the slider movement. For example, the pinion shaft is drivable rotationally by means of an actuator. The ventilation device can have a bar extension which is arranged on the pinion shaft in order to widen or respectively lengthen the latter in the direction of the longitudinal axis. The bar extension can thereby serve for example as rotational actuation for the pinion shaft or can be used within a pinion shaft mounting operation for handling the pinion shaft. This offers the advantage that the pinion shaft can be actuated relatively easily or respectively can be moved within a mounting operation relatively easily, for example manually by hand or in an automated manner by means of automation arrangements.

Expediently, the pinion shaft can have a stem body, wherein on at least one free stem end of the stem body an equipping area is formed, on which the bar extension is arranged.

Further expediently, the bar extension can define an axial bar extension longitudinal axis along its main extent, wherein the bar extension longitudinal axis and the longitudinal axis of the pinion shaft are aligned coaxially to one another. An angled arrangement of the bar extension on the pinion shaft is conceivable, however it has been found that the coaxial arrangement enables a far better manageability.

In order to remove the bar extension from the pinion shaft after the mounting of the pinion shaft relatively easily and without an additional tool, at least one predetermined breaking portion can be formed between the bar extension and the pinion shaft, which enables the removing of the bar extension from the pinion shaft, as desired.

In particular, the predetermined breaking portion can be realized as a cross-section narrowing. Here, at least one single predetermined breaking cross-section of the predetermined breaking portion can be configured to be small area-wise with respect to each bar extension cross-section of the bar extension and with respect to each pinion shaft cross-section of the pinion shaft.

Further in particular the predetermined breaking portion can be realized as a material weakening portion, wherein the material characteristics of the predetermined breaking portion are realized in a manner promoting predetermined breaking with respect to the material characteristics of the regions on the pinon shaft and on the bar extension immediately surrounding the predetermined breaking portion.

Promoting predetermined breaking means in this context that in particular the mechanical material characteristics in the predetermined breaking portion are comparatively poor or that expediently a mechanically weaker resistance exists than in the regions of the pinion shaft and of the bar extension surrounding the predetermined breaking portion.

Expediently, the bar extension can be arranged on the pinion shaft in a materially bonded and/or force-fitting and/or form-fitting manner Thereby, it is ensured that the bar extension is always fixed securely on the pinion shaft, in particular also in the case of stresses within a mounting operation, and is not detached from the pinion shaft unintentionally.

Further expediently, the bar extension and the pinion shaft can be embodied in one piece, therefore integrally. For this, for example an injection moulding process presents itself, within which a one-piece bar extension/pinion shaft component can be produced at a favourable cost.

The bar extension can have a base body which is configured hollow-cylindrically or cylindrically. The base body can have, at each location along its bar extension longitudinal axis, circular, circular-ring-shaped, oval, oval-ring-shaped or polygonal base cross-section areas which are constant area-wise. Basically, one can also imagine that the base cross-section areas change along the bar extension longitudinal axis, for example the base cross-section areas can become smaller area-wise with increasing distance from the pinion shaft, when the bar extension is arranged on the pinion shaft, so that a cone-like base body is formed, converging in a manner tapering towards the exterior.

Furthermore, on an outer shell surface of the bar extension, functional elements, preferably tooth flanks or suchlike, can be arranged, spaced apart from one another in circumferential direction around the pinion shaft. In particular, a tool can engage in a touching manner onto the rotatingly circumferential functional elements. One can also imagine that an actuator is arranged on the functional elements, in order to actuate the pinion shaft.

At least one of the two sliders can have a mounting aid arrangement for assisting the mounting of the respective slider within the housing and/or within the fluid channel system. The mounting aid arrangement expediently comprises a single, two, three and preferably four mounting projections which are arranged in a materially bonded or force- and form-fitting manner on the slider body of the respective slider. It has been found that preferably hemispherical mounting projections can be advantageous. In any case, provision is made that within a mounting operation of the slider by means of an end effector mounted on a mounting robot, all the mounting projections of the mounting aid arrangement can be grasped, in order to hold and move the slider, in particular in order to position the slider within the housing and/or within the fluid channel system. One can also imagine that one grasps the mounting projections of the mounting aid arrangement by hand or with a hand tool, in order to hold or move the slider. Expediently, all the mounting projections project away from the slider in vertical direction along a body vertical axis aligned at right angles to the two body axes spanning the slider.

In summary, it remains to state: The present invention preferably relates to a ventilation device, with a fluid channel system, with a slider arrangement for the providing of mixed fluid of cold fluid and/or hot fluid, wherein the slider arrangement has at least two sliders which are actuatable to and fro respectively within a slider movement, wherein the slider arrangement has a pinion shaft, arranged in a touching manner, drivable rotationally in circumferential direction about its longitudinal axis, for actuating the respective sliders.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE PREFERRED EMBODIMENTS

Figure 1B:
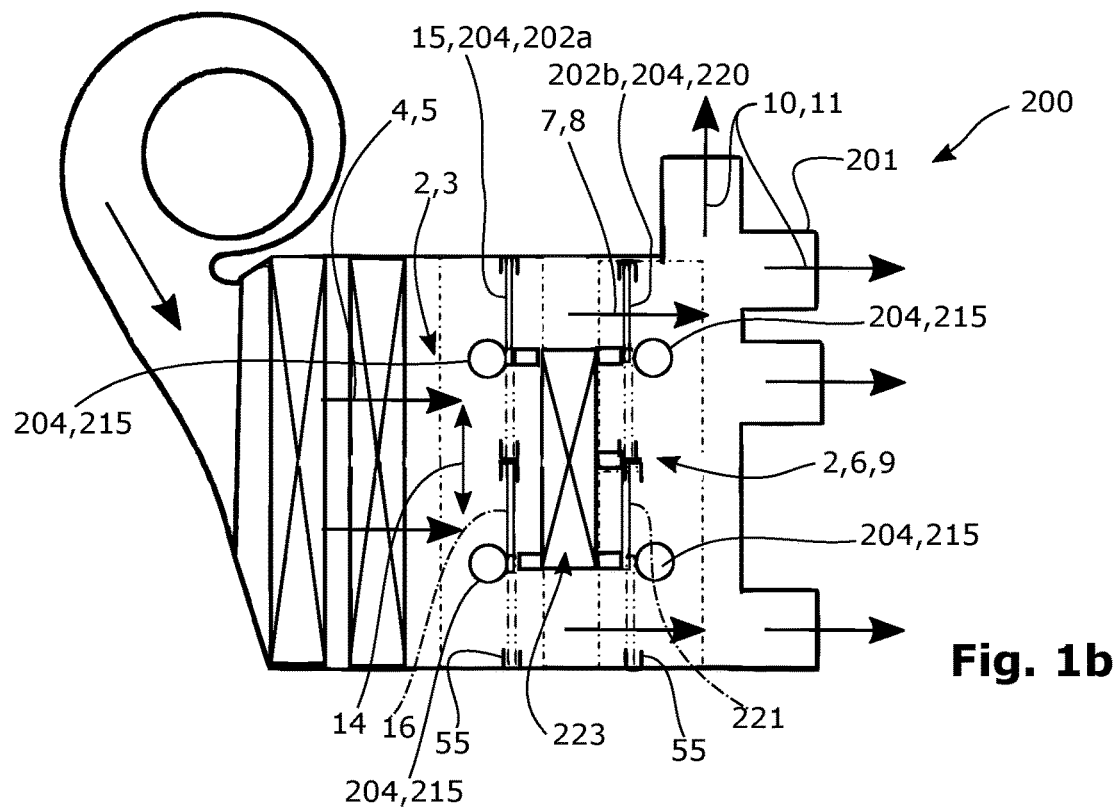
Figure 1C:
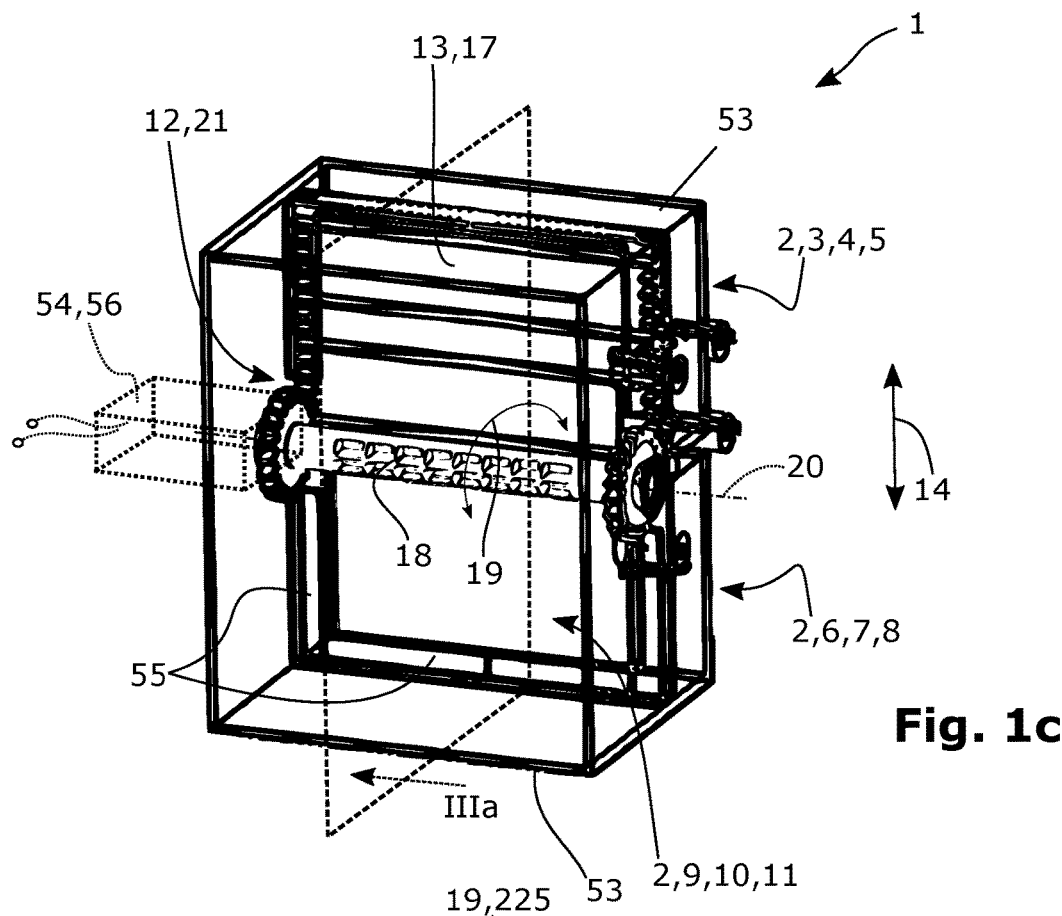
Figure 2A:
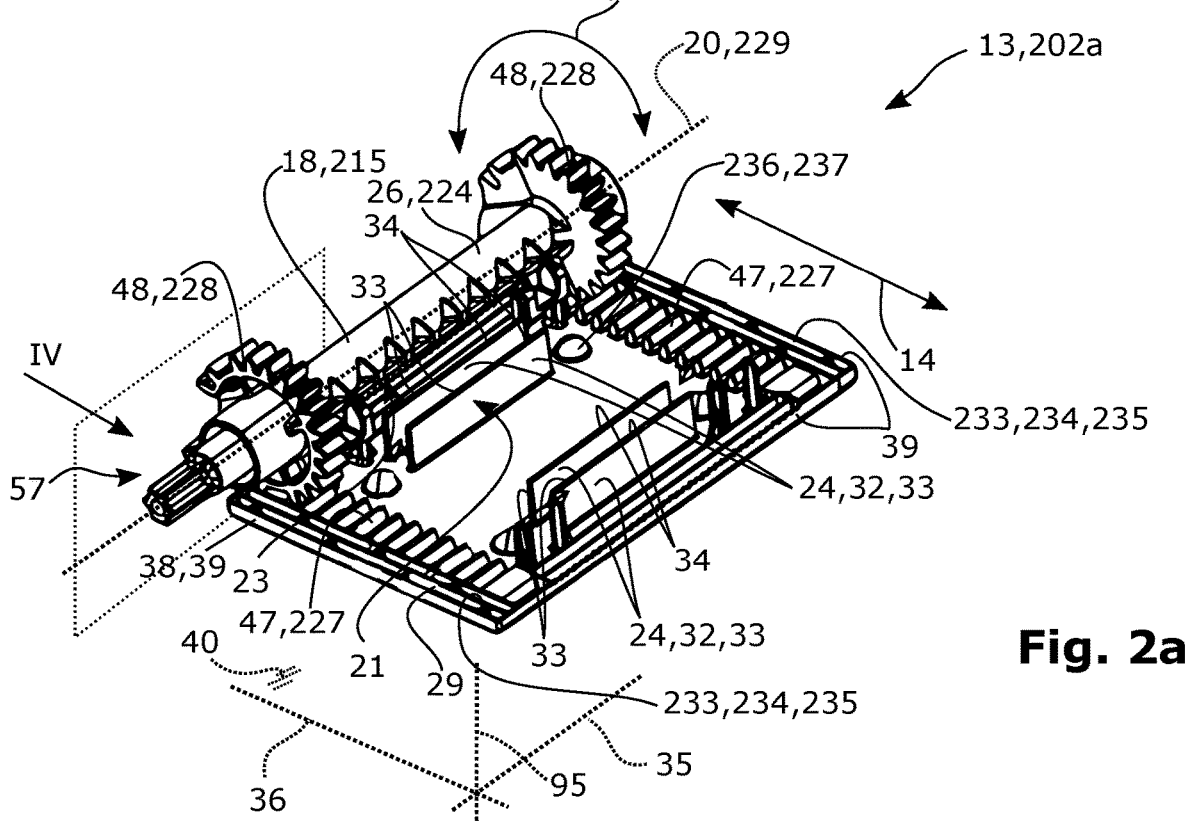
Figure 2B:
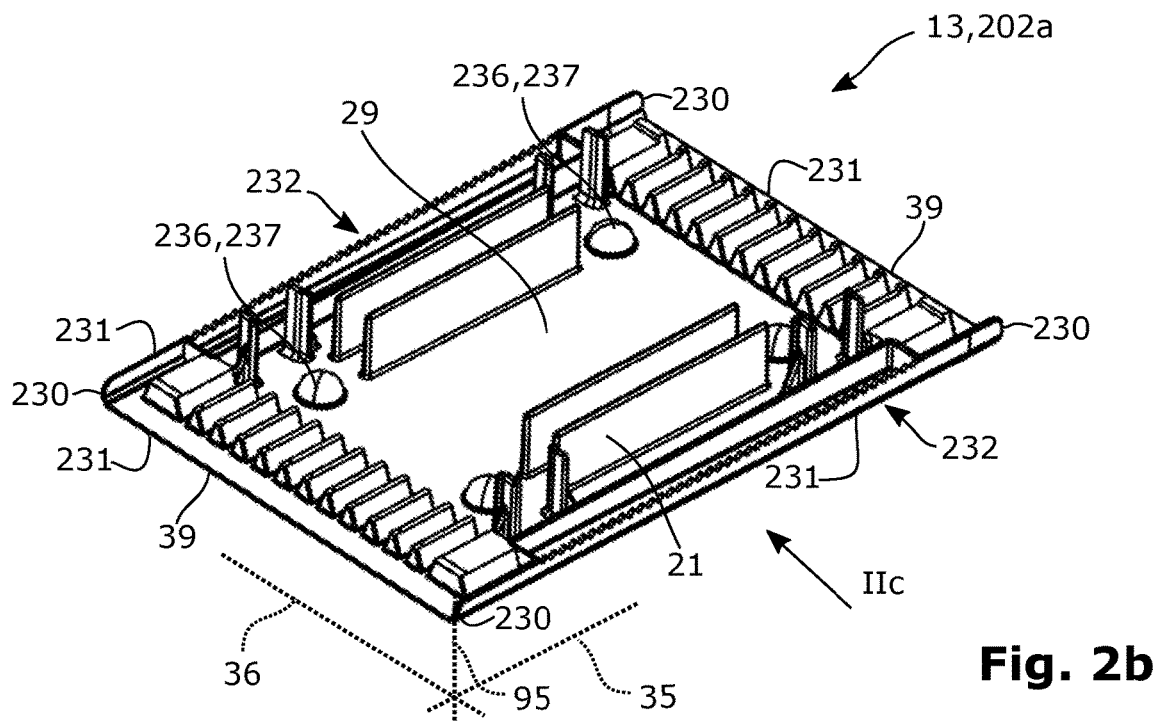
Figure 2C:
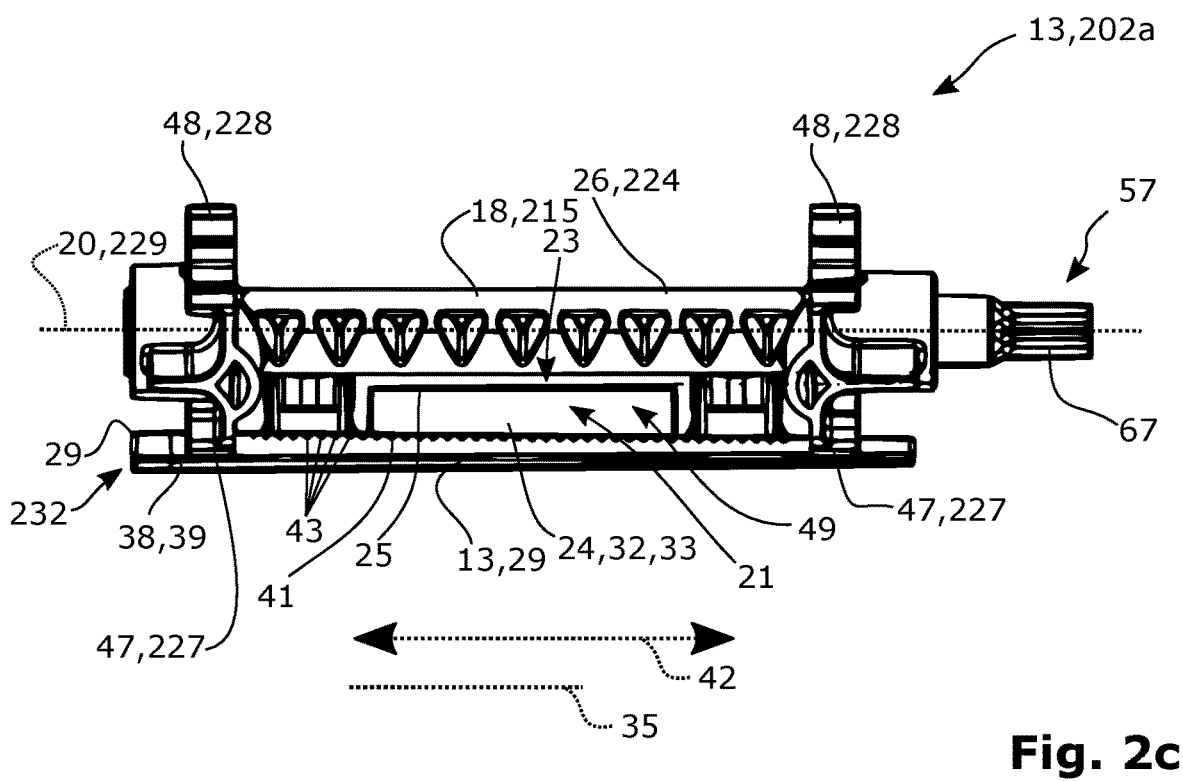
Figure 2D:
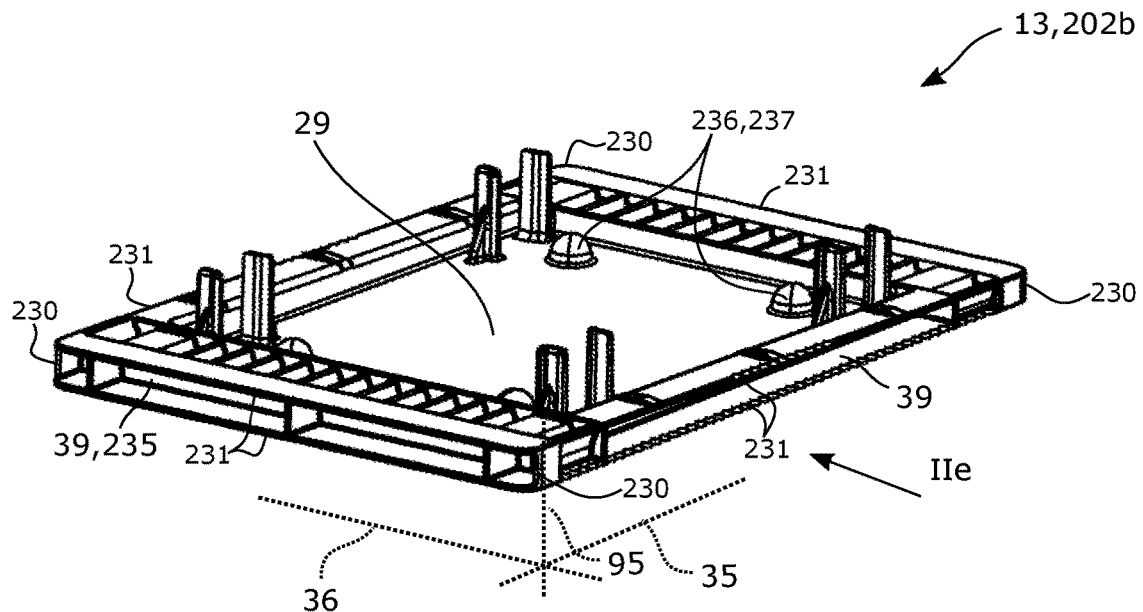
Figure 2E:
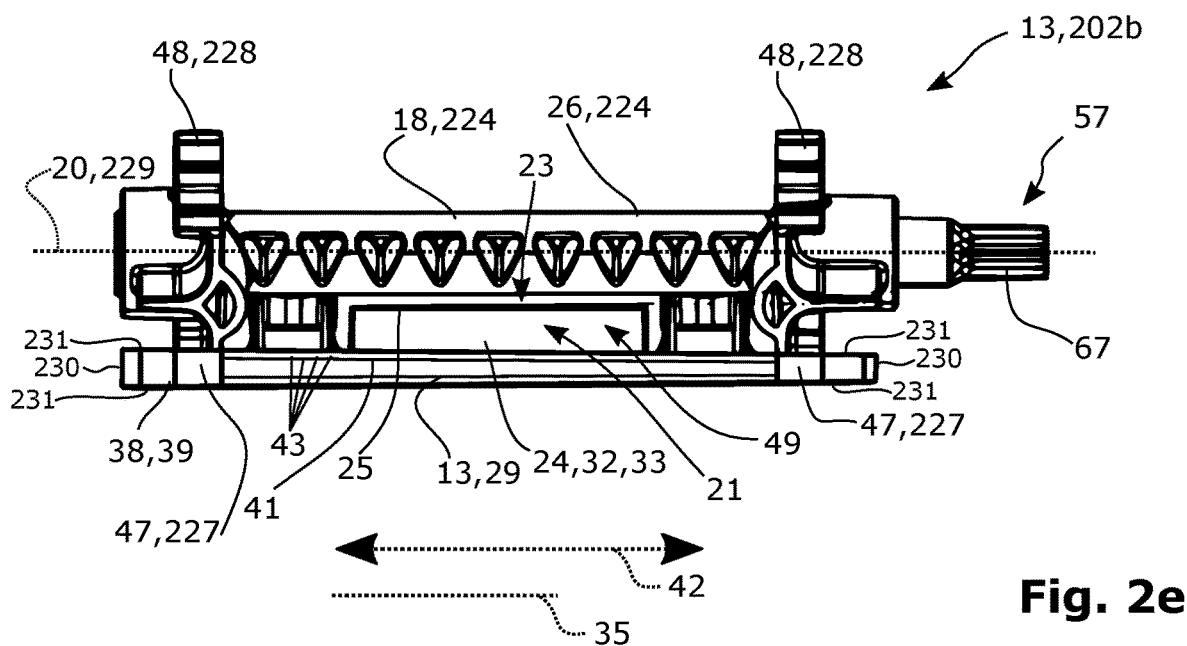
Figure 3:
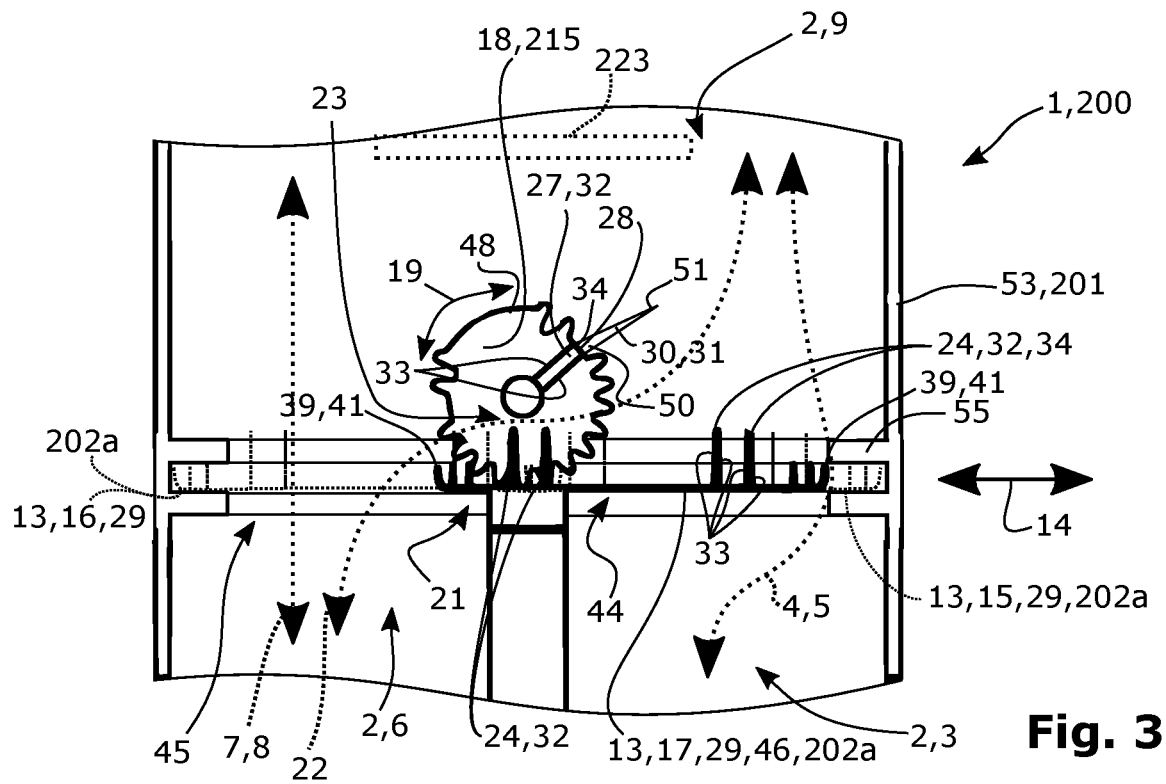
Figure 4:
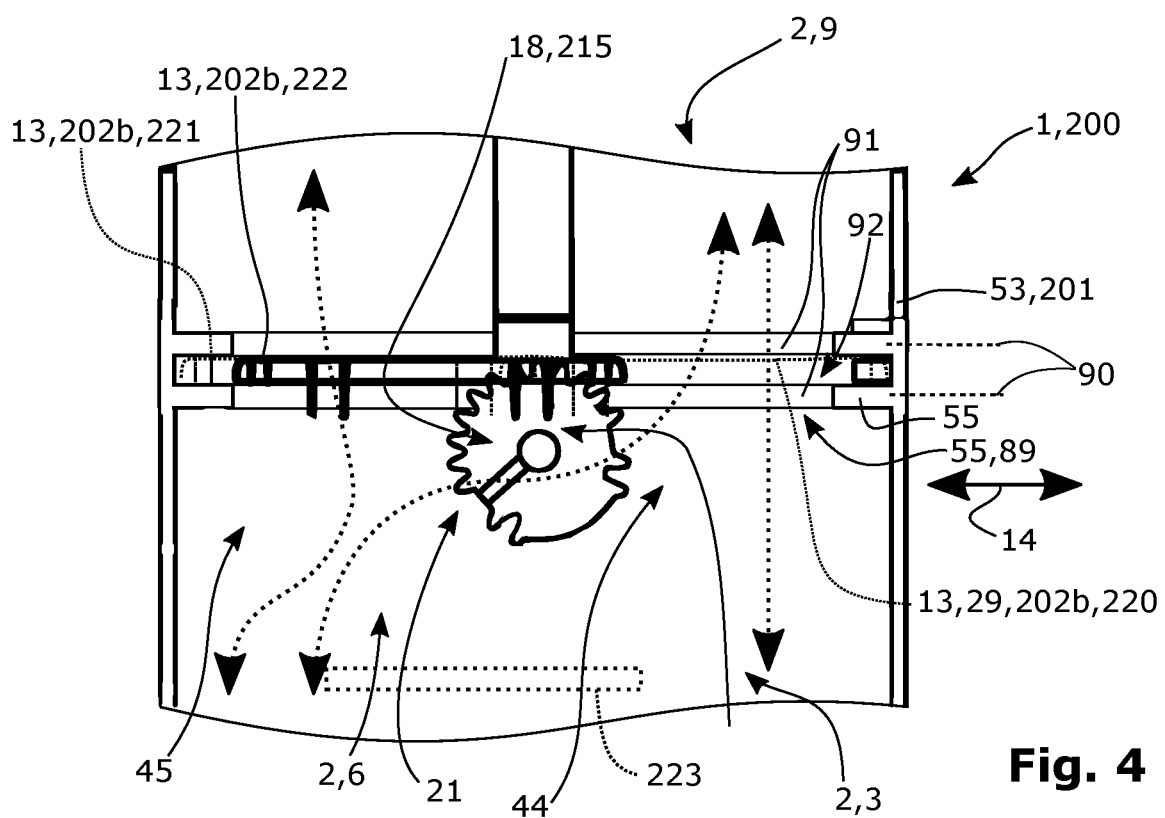
Figure 5:
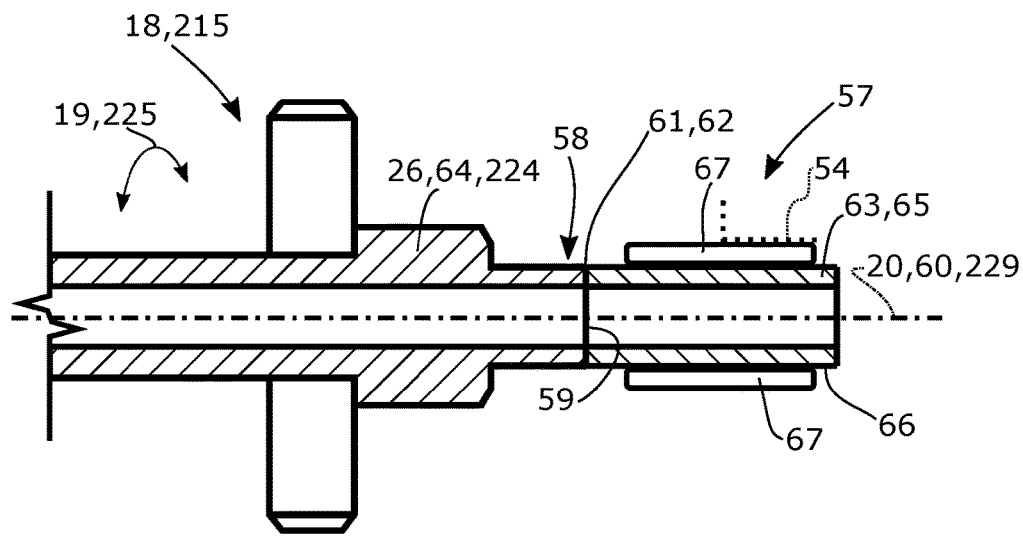
Figure 10:
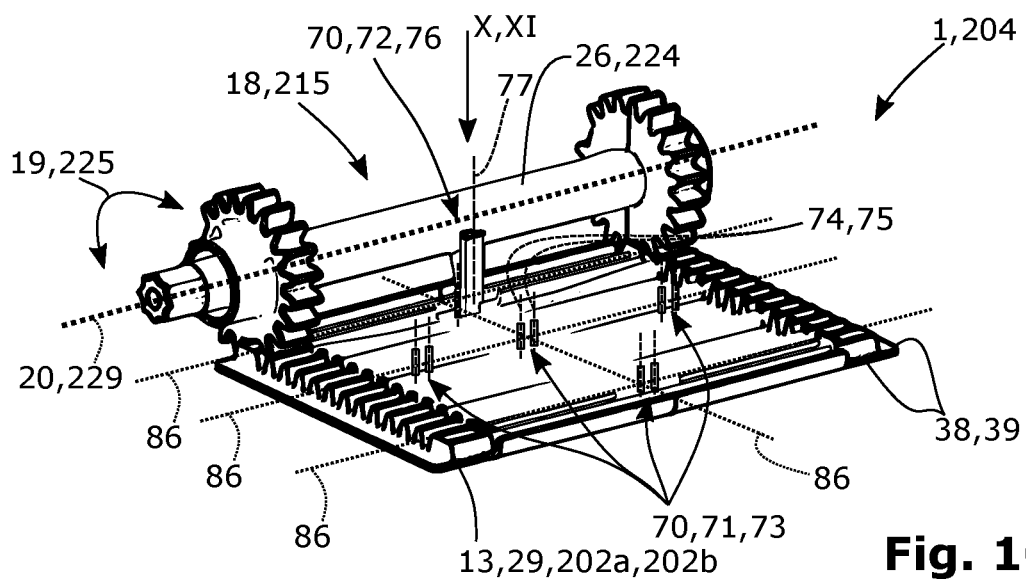
Figure 11:
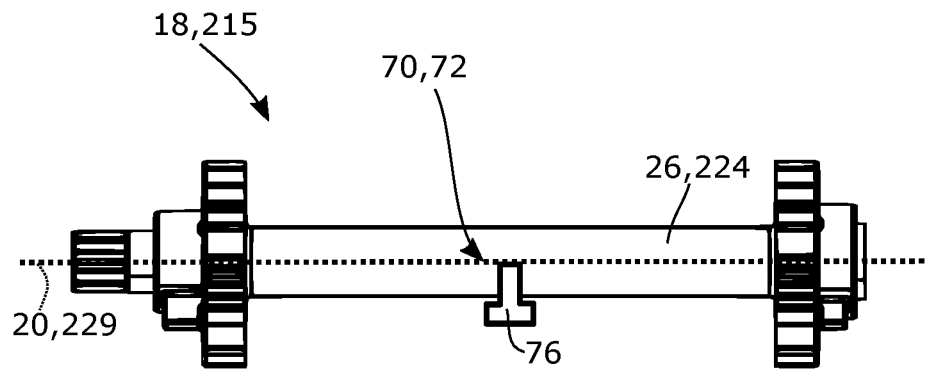
Figure 12:
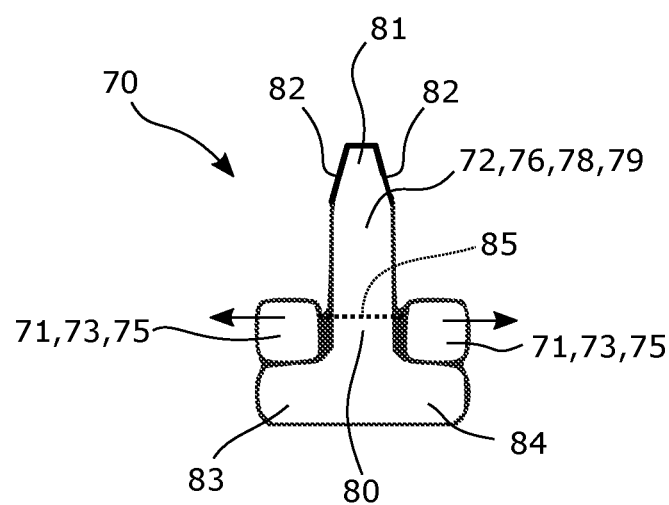
Figure 13:
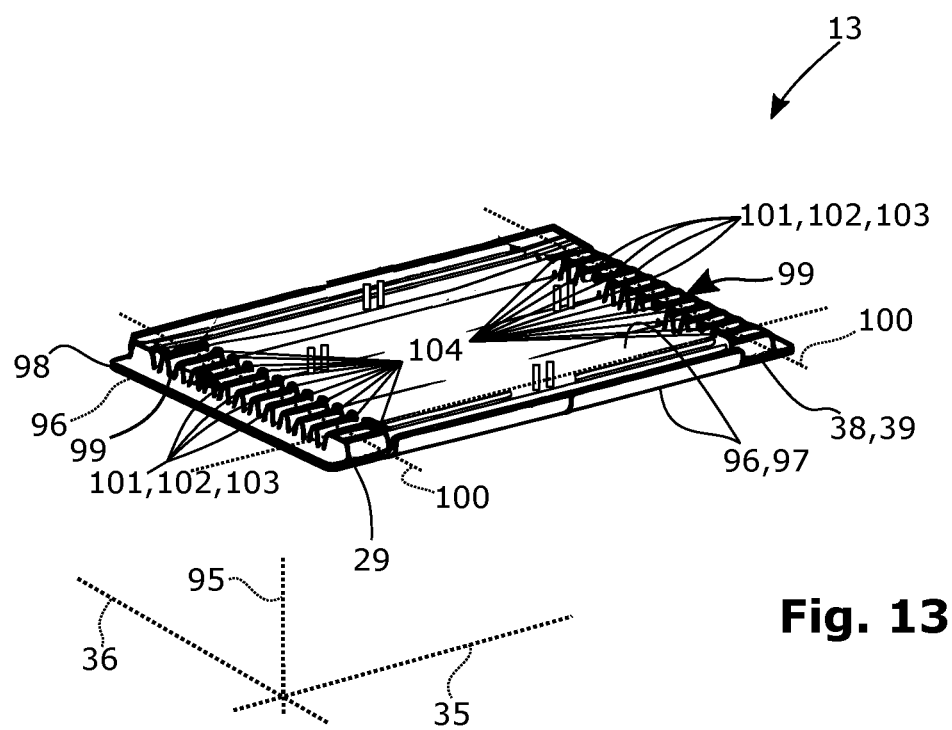

There are shown, respectively schematically,

FIG. 1a shows, in a perspective view, a longitudinal section of an example embodiment of a ventilation device with sliders and pinion shafts of a slider arrangement, FIG. 1b shows, in a sectional view, a longitudinal section of a further example embodiment of a ventilation device, FIG. 1c shows a perspective view of a further example embodiment of a ventilation device with a slider and with a pinion shaft, FIG. 2a shows a perspective view of a slider of a first slider construction of a first variant of the slider with a pinion shaft, FIG. 2b shows a perspective view of a slider with a second slider construction of a first variant of the slider, but without pinion shaft, so that the slider can be seen better, FIG. 2c shows a front view of the slider according to FIG. 2b according to an arrow IIc recorded in FIG. 2b, but now with pinion shaft, FIG. 2d shows a perspective view of a slider in a first slider construction of a second variant of the slider, without pinion shaft, FIG. 2e shows a front view of the slider according to FIG. 2d according to an arrow IIe recorded in FIG. 2d, but now with pinion shaft, FIG. 3 shows, in a sectional view of the ventilation device of FIG. 1c according to a section plane illustrated by dashed lines and in a viewing direction of an arrow IIIa recorded in FIG. 1c, a slider according to the second slider construction of the first variant of the slider and a pinion shaft, FIG. 4 shows, in a sectional view of the ventilation device of FIG. 1c according to a section plane illustrated by dashed lines and in a viewing direction of an arrow IIIa recorded in FIG. 1c, a slider according to the first slider construction of the second variant of the slider and a pinion shaft, FIG. 5 shows a sectional view of a part of the pinion shaft of the ventilation device, in section according to a section plane recorded in FIG. 2a by dashed lines, with viewing direction of an arrow IV recorded in FIG. 2a, FIGS. 6 to 9 show, in several section views respectively, a variant of a pinion shaft in section according to a section plane which is not illustrated, FIG. 10 shows a perspective view of a preferred further example embodiment of a ventilation device with slider arrangement, FIG. 11 shows, in a top view, a pinion shaft of FIG. 10 according to an arrow X recorded there, wherein a slider is removed, FIG. 12 shows, in a top view, a clamping arrangement of FIG. 10 according to an arrow XI recorded there, wherein a slider and a pinion shaft is removed for better visibility, FIG. 13 shows, in a perspective view, a preferred further example embodiment of a slider with protuberance elements.

DETAILED DESCRIPTION

FIG. 1a to 13 show as a whole preferred example embodiments of a ventilation device 1, 200 which is preferably used for the ventilating or respectively air conditioning of a motor vehicle interior of a road motor vehicle, in particular on or in an electrically drivable road motor vehicle. In so far as components with identical or at least similar function are present in the example embodiments, identical reference numbers were assigned, in order to avoid repetitions.

FIG. 1a shows by way of example a longitudinal section of a first example embodiment of a ventilation device 200 in a perspective view. FIG. 1b shows a longitudinal section of a further example embodiment of a ventilation device 200. The ventilation device 200 has a housing 201, which accommodates in the interior two or more guidably arranged sliders 202a, 202b and pinion shafts 215 of a slider arrangement 204 of the ventilation device 200. It can be seen furthermore that the housing 201 of the ventilation device 200 has or forms a fluid channel system 2, through which fluid can flow in the directions indicated by arrows in FIG. 1b. The fluid channel system 2 has or delimits a cold channel 3, a hot channel 6 and a mixed channel 9. The cold channel 3 serves for the directing of a cold fluid flow 4 of cold fluid 5, the hot channel 6 serves for the directing of a hot fluid flow 7 of hot fluid 8, and the mixed channel 9 serves for the directing of a mixed fluid flow 10 of mixed fluid 11, wherein the mixed fluid 11 is provided from cold fluid 5 and/or hot fluid 8. By way of example, in the cold channel 3 and/or in the hot channel 6 a heat exchanger 223 can be arranged, for example the heat exchanger 223 can form a cold-generating arrangement or a heat-generating arrangement, which are not illustrated, by means of which the fluid in the respective channel 3, 6, 9 is able to be cooled or heated as desired. The two sliders 202a, 202b according to FIGS. 1a and 1b serve to control one or more of the fluid flows 4, 7, 10 through the fluid channel system 2 according to a predetermined or predeterminable volume flow or mass flow, and to set for this a predetermined or predeterminable temperature of the mixed fluid 11 by mixing. Here, it has been found that it is advantageous to optimize the two sliders 202a, 202b constructively according to functional points of view, namely so that the one first slider 202a is relatively well suited for the setting of a volume flow or mass flow of the respective fluid flow, and the other, second, slider 202b is relatively well suited for the mixing of the fluid flows 4, 7, 10 and for the setting of a temperature of the mixed fluid 11. Hereby, one obtains a first slider 202a, especially configured for the volume flow-dependent or mass flow-dependent controlling of the fluid flows 4, 7, 10, which in specialist circles is also designated as forward flow slider, and a second slider 202b, suitable for the providing of mixed fluid 11 of a predetermined or predeterminable temperature, which in the corresponding specialist circles is known as reverse flow slider. The sliders 202a, 202b are guidably mounted in the housing 201 or within the fluid channel system 2 of the ventilation device 200 via a guide arrangement 55, respectively separately, therefore independently of one another, so that the sliders 202a, 202b are movable respectively independently of one another and within a slider movement 14 indicated in FIGS. 1a and 1b respectively by double arrows. Expediently, the first slider 202a, therefore the forward flow slider, can be actuated to and fro here between a hot position 15, a cold position 16, an intermediate position 17 (not illustrated). Expediently, the second slider 202b, therefore the reverse flow slider, can be actuated to and fro here between a first mixed position 220, a second mixed position 221 and an intermediate mixed position 222 (not illustrated). The different positions 15, 16, 220, 221 are indicated by way of example in FIG. 1b.

The slider arrangement 204 has, in addition to the first slider 202a and the second slider 202b, by way of example two pinion shafts 215, which are arranged respectively in a touching manner on one of the two sliders 202a, 202b, see FIGS. 1a and 1b. The pinion shafts 215 of the slider arrangement 204 are respectively of cylindrical shape and have a substantially cylindrical stem body 224, the cross-section of which is configured to be continuously round or oval or polygonal. The pinion shafts 215 are configured to be rotationally drivable in a circumferential direction 225 about a longitudinal axis 229 defined by the respective pinion shaft 215 or respectively by its stem body 224, in order to be able to drive the respective slider 202a, 202b within the respective slider movement 14, see in particular FIG. 1a. For example, for driving the pinion shafts 215 a single shared or respective a separate actuator 226 can be arranged on the housing 201 of the ventilation device 200 and can be drivingly connected with the pinion shafts 215, see in particular FIG. 1a, where by way of example respectively a separate actuator 226 is provided. The actuators 226 can be actuated and/or regulated expediently via a control, which is not illustrated.

Furthermore, the pinion shafts 215 are applied respectively in a touching manner on the sliders 202a, 202, so that by means of the pinion shafts 215 an actuating of the respective slider 202a, 202b is possible within the respective slider movement 14. In this context, it can be seen in particular in FIG. 1a that each slider 202a, 202b has an actuation arrangement 227, in particular respectively a pair of pinion shafts or tooth rows, by means of which the respective slider 202a, 202b is able to be actuated within the respective slider movement 14. The actuation arrangements 227 of the sliders 202a, 202b expediently interact in a touching manner respectively with a counter-actuation arrangement 228, in particular respectively with a pair of toothed wheels or pinions, arranged on one of the pinion shafts 215 and configured in a complementary manner to the actuation arrangements 227. The counter-actuation arrangements 228 project expediently transversely or in an angled manner to the respective longitudinal axis 229 over the stem body 224 of the respective pinion shaft 215, so that, in operation of the ventilation device 200, they can interact in a touching manner with the actuation arrangement 227 within the slider movement 14, without the respective stem body 224 touching the respective slider 202a, 202b.

FIG. 1c shows a further example embodiment, namely by way of example a ventilation device 1 in a perspective view, wherein the ventilation device 1 is equipped with a housing 53, with a fluid channel system 2 and with a slider arrangement 12, as in the preceding example embodiments. The housing 53 has or delimits a fluid channel system 2 of a cold channel 3, a hot channel 6 and a mixed channel 9, likewise as in the preceding example embodiment. The cold channel 3 serves for the directing of a cold fluid flow 4 of cold fluid 5, the hot channel 6 serves for the directing of a hot fluid flow 7 of hot fluid 8 and the mixed channel 9 serves for the directing of a mixed fluid flow 10 of mixed fluid 11, wherein the mixed fluid 11 is provided from cold fluid 5 and/or hot fluid 6, see in particular FIG. 1c. By way of example, in the fluid channel system 2, a heat exchanger 223 can be installed, which in the cold channel 3 forms a cold-generating arrangement, which is not illustrated, and in the hot channel 6 forms a heat-generating arrangement, which is not illustrated, so that fluid is able to be cooled or able to be heated in the respective channel 3, 6 as desired. The slider arrangement 12 serves again for the providing of mixed fluid 11 of cold fluid 5 and/or hot fluid 8, in particular for the mixing of cold fluid 5 with hot fluid 8. For this purpose, the slider arrangement 12, in contrast to the preceding example embodiment, has a single slider, designated by the reference number 13, and a pinion shaft 18. The slider 13, which can concern either a forward flow slider or a reverse flow slider or a combination of forward flow and reverse flow slider, is guidably mounted in the housing 53 via a guide arrangement 55 so that the slider 13 is actuatable to and fro, within a slider movement 14, indicated in particular by a double arrow in FIG. 1c, between a hot position 15, a cold position 16 and at least one intermediate position 17, wherein the different positions 15, 16 are indicated by way of example in FIG. 3.

The pinion shaft 18 of the slider arrangement 12, able to be seen in particular in FIG. 1c, is of cylindrical shape and has a substantially cylindrical stem body 26, the cross-section of which is configured to be continuously round or oval or polygonal. The pinion shaft 18 is configured to be rotationally drivable in a circumferential direction 19 about a longitudinal axis 20 defined by the pinion shaft 18 or respectively by its stem body 26, as in the first example embodiment. For example, for driving the pinion shaft 18 an actuator 54 can be arranged on the housing 53 of the ventilation device 1 and can be drivingly connected to the pinion shaft 18, as in the first example embodiment, see in particular FIGS. 1a and/or 1c. The actuator 54 can be expediently actuated and/or regulated via a control 56, according to FIG. 1c the control 56 is advantageously integrated into the actuator 54. Furthermore, the pinion shaft 18 is applied in a touching manner on the slider 13, so that by means of the pinion shaft 18 an actuation of the slider 13 is possible within the slider movement 14.

In this context, it can be seen in particular in FIG. 1c, that the slider 13 has an actuation arrangement 47, in particular a pair of pinion shafts or tooth rows, by means of which the slider 13 is actuatable within the slider movement 14. The actuation arrangement 47 interacts here with a counter-actuation arrangement 48, in particular with toothed wheel or a pinion, arranged on the pinion shaft 18 and configured in a complementary manner to the actuation arrangement 47. The counter-actuation arrangement 48 expediently projects transversely or in an angled manner to the longitudinal axis 20 over the stem body 26 of the pinion shaft 18 so that, in operation of the ventilation device 1, it can interact in a touching manner with the actuation arrangement 47 for the actuating of the slider 13 within the slider movement 14.

As indicated above, the sliders 13, 202a, 202b according to the two above example embodiments can basically be provided in two different variants, namely either as forward flow slider 202a or as reverse flow slider 202b. Each variant can comprise further slider constructions. By means of FIGS. 2a, 2b and 2c, the function and configuration of the first variant of the slider 13 or respectively of the slider 202a, designated as forward flow slider, will be explained below.

The described first variant of the slider 13 or respectively of the slider 202*a* can be used in two different slider constructions.

The slider 13 designated as forward flow slider or respectively first slider 202*a* according to the first variant has basically a slider body 29, which is, for example, of cuboid-like or trapezoidal shape. The slider body 29 can preferably be produced from a plastic or, as one can also at least imagine, from a metal material. The slider 13 designated as forward flow slider or respectively first slider 202*a* serves especially for the volume flow-dependent or mass flow-dependent controlling of the fluid flows 4, 7, 10 through the ventilation device 1, 200. Preferably, the slider 13 or respectively the first slider 202*a* is arranged upstream, therefore in the fluid flow before, the heat exchanger 223.

In FIG. 2*a* one can see a perspective view of a first slider construction of the first slider 13, 202*a* according to the first variant of the slider 13, 202*a* with a pinion shaft 18, 215 lying in a touching manner on the slider 13, 202*a*. The first slider 13, 202*a* has here an in particular substantially plate-shaped slider body 29, which extends along two body axes 35, 36, along the length and width, aligned in an angled manner, in particular at right angles, to one another, see in particular FIG. 2*a*. The body axes 35, 36 can span between them a body plane 40, in which the slider body 29 lies.

The slider body 29 extends vertically along a body vertical axis 95 aligned orthogonally to the body axes 35, 36. In the direction of the body vertical axis 95, however, it is configured to be relatively short compared to the extent along the length and width. The slider body 29 defines a circumferential, free and flat cohesive edge 39. The first slider construction of the first variant of the slider 13, 202*a* is distinguished by an edge 39, reinforced in a honeycomb-like manner, which could also be designated as reinforcement 233 or labyrinth edge 234, see FIG. 2*a*. As indicated, the reinforcement 233 or the labyrinth edge 234 has a plurality of honeycomb-like or box-like configuration elements 234, which are arranged for the reinforcing of the slider body 29 along the slider body 29, there in particular directly on the edge 39. Expediently, the individual honeycomb-like or box-like configuration elements 235 have respectively a circumferential wall and an opening, the orifice area of which points in the direction of the body vertical axis 95 away from the slider body 29. Furthermore, the slider body 29 in the direction of the body vertical axis 95, is embodied to be relatively strong or respectively thick, in particular compared to the following second slider constructions of the first variant, namely a few millimetres thick, in particular 1 mm, 2 mm or 3 mm thick, so that it can be stated that the edge 39 forms a relatively thick edge 39. The edge 39, in particular compared to the following second slider constructions of the first variant, is relatively rigid and offers relatively great resistance against deformation, for example against a pressure load deformation.

The second slider construction of the first variant of the slider 13, 202*a* according to FIGS. 2*b* and 2*c*, has likewise a slider body 29, which as above extends along the width and length along body axes 35, 36. In contrast to the labyrinth edge 39 explained above, the second slider construction of the first variant of the slider 13, 202*a* is distinguished by a C-shaped or U-shaped tapering edge 39, which compared to the edge 39 of the first slider construction of the first variant of the slider 13, 202*a* is configured to be relatively thin and/or flat and is designated as arched edge 232. The slider body 29 is therefore by way of example only a few millimetres thick in the direction of the body vertical axis 95, for example 0.2 mm, 0.5 mm or 0.9 mm or 1 mm, so that it can be stated that the edge 39 forms a relatively flat edge 39. This has the advantageous effect that the slider body 29 as a whole is relatively flexible and lightweight.

For the sake of completeness, it is also mentioned that it can be seen furthermore in FIGS. 2*a*, 2*c*, 2*e* that the respective pinion shaft 18, 215 has a counter-actuation arrangement 38, 228 which is able to be brought into engagement with an actuation arrangement 47, 227 of the respective slider 13, 202*a*, 202*b*, and furthermore is equipped with a bar extension 57, which by way of example is joined onto a free stem end 58 of the stem body 26, 224. For example, the actuator 54, 226 can engage drivingly onto the bar extension 57. The bar extension 57 can be equipped externally circumferentially with functional elements 67, for example tooth flanks or suchlike. Alternatively or additionally, the bar extension 57 can be used for mounting purposes, for example as insertion aid for the pinion shaft 18, 215 into recesses arranged on the housing 53, 201. With respect to the bar extension 57, reference is to be made at this point to the description concerning FIGS. 4 to 7, where it is described in more detail how the bar extension 57 is configured.

With the aid of FIGS. 2*d* and 2*e*, the function and configuration is further explained of a second variant of the slider 13, designated as reverse flow slider, or respectively of the second slider 202*b*. The described second slider 13, 202*b* is presented only in a single slider construction, but can of course have the modifications, described above, according to the first and second slider constructions of the first variant of the slider 13, 202*a*.

The slider 13, designated as reverse flow slider, or respectively second slider 202*b* has basically a slider body 29, which is for example of cuboid-like or trapezoidal configuration. The slider body 29 can preferably be produced from a plastic or, as can also be at least imagined, from a metal material. The slider 13, 202*b*, designated as reverse flow slider, serves in operation of the ventilation device 1, 200 as a temperature mixer valve, it is therefore preferably arranged in fluid flow direction after a heat-generating arrangement 223 and mixes, according to position within the slider movement 14, cold fluid 4 and/or hot fluid 8 to mixed fluid 11. Thereby, mixed fluid 11 can be provided with a predetermined or predeterminable temperature. The slider body 29 extends, along the length and width, along two body axes 35, 36, which are aligned in an angled manner, in particular at right angles, to one another, see in particular FIG. 2*d*. The slider body 29 extends vertically along a body vertical axis 95 aligned orthogonally to the body axes 35, 36, however it is configured to be only relatively short compared to the extent along the length and width. The slider body 29 defines a circumferential, free and flat cohesive edge 39.

With the aid of the views of the second slider 13, 202*b* illustrated in FIGS. 2*d*, 2*e*, it can be seen that the slider body 29 has a relatively thick circumferential edge 39, when one compares the slider 13, 202*b* according to the second slider variant with the sliders 13, 202*a* according to the first variant, which one could therefore also designate as labyrinth edge 39. As indicated, the edge 39 is distinguished by a plurality of box-like configuration elements 235, which are arranged for reinforcement of the slider body 29, in particular transversely or parallel to the body axes 35, 36, along the slider body 29, in particular on the edge 39. Expediently, the individual box-like configuration elements 235 have an opening, the orifice area of which point in the direction of one of the body axes 35, 36 away from the slider body 29. Furthermore, the slider body 29 in the direction of the body vertical axis 95, in particular compared to the above slider constructions of the first slider variant, is embodied to be relatively strong or respectively thick, namely a few millimetres thick, in particular 1 mm, 2 mm or 3 mm thick, so that it can be stated that the edge 39 forms a relatively thick edge 39. The edge 39, in particular compared to the above construction variants of the first slider variant, is relatively rigid and offers relatively great resistance against deformation, for example against a pressure load deformation.

According to FIG. 2*b*, the slider body 29 of the first slider 13, 202*a* can have four margin vertical edges 230 aligned parallel or substantially parallel with respect to the body vertical axis 95. The margin vertical edges 230 are connected with one another respectively via margin longitudinal edges 231, which are aligned parallel or substantially parallel to the body axes 35, 36. In particular in FIG. 2*b* it can be seen that respectively two immediately adjacent margin vertical edges 230 together are configured bent with respect to the body axes 35, 36, in particular in a C-shaped or U-shaped manner, so that the slider body 29 of the first slider 13, 202*a* on two edge portions 38 of the slider 13, 202*a*, which are opposed to one another, has respectively an arched edge 232. Thereby, a controlling or regulating of a volume flow and/or of a mass flow of fluid flows 4, 7, 10 can be assisted.

The slider body 29 of the second slider 13, 202*b* can also have four margin vertical edges 230 aligned parallel or substantially parallel with respect to the body vertical axis 95, see in particular FIG. 2*d*. The margin vertical edges 230 are likewise connected with one another via margin longitudinal edges 231 aligned respectively parallel or substantially parallel to the body axes 35, 36. It has been found that it is advantageous: to configure a single margin vertical edge 231 to be shorter in vertical direction than the remaining margin vertical edges 231, furthermore to configure a single margin vertical edge 231 to be longer in vertical direction than the remaining margin vertical edges 231, furthermore to configure two margin vertical edges 231 to be of equal length in vertical direction or respectively longer in vertical direction than the shortest margin vertical edge 231, and to configure them to be respectively shorter in vertical direction than the longest margin vertical edge 231. Thereby, a slider body geometry is defined, which has the advantageous effect of assisting an injection moulding production suitability of the second slider 13, 202*b*, so that in particular the production suitability of the second slider 13, 202*b* is improved.

FIG. 3 shows in a sectional view the ventilation device 1, 200 with a slider 13, 202*a* designated as forward flow slider according to the second slider construction of the first slider variant, therefore a forward flow slider with a C-shaped or U-shaped edge 39. It can be seen that the slider 13, 202*a* is arranged upstream before a heat exchanger 223 which is indicated by dotted lines. Furthermore, it can be seen that the first slider 13, 202*a* is guidably mounted in the housing 53, 201 via a guide arrangement 55 so that the first slider 13, 202*a* within the slider movement 14 indicated by a double arrow is actuatable to and fro between a hot position 15, a cold position 16 and at least one intermediate position 17. Thereby, a fluid flow through the fluid channel system 2 can be optionally controlled and/or regulated, in particular according to a predetermined or predeterminable volume flow or mass flow.

FIG. 4 shows in a sectional view the ventilation device 1, 200, which is equipped with a second slider 13, 202*b*, configured as reverse flow slider, according to the first slider construction of the second slider variant. The second slider 13, 202*b* is guidably mounted in the housing 53, 201 via a guide arrangement 55 so that the second slider 13, 202*b* within slider movements 14 indicated by a double arrow is actuatable to and fro between a first mixed position 220, a second mixed position 221 and an intermediate mixed position 222. In the first mixed position 220, the slider 13, 202*b* can close a cold orifice opening area 44 of the cold channel 3 in a fluid-tight manner, so that hot fluid 8 flows out from the hot channel 6 into the mixed channel 9. Furthermore, in the second mixed position 221 the second slider 13, 202*b* can close a hot orifice opening area 45 of the hot channel 6 in a fluid-tight manner, so that cold fluid 5 flows out from the cold channel 3 into the mixed channel 9. Furthermore, in at least one intermediate mixed position 222 the second slider 13, 202*b* can be actuated between the first and second mixed position 220, 221, so that the second slider 13, 202*b* closes a predeterminable or predetermined area portion of the cold orifice opening area 44 and a predeterminable or predetermined area portion of the hot orifice opening area 45, so that volume proportions, which are adjustable as desired, of hot fluid 8 from the hot channel 6 and of cold fluid 5 from the cold channel 3 can be provided in a mixed manner in the mixed channel 9.

With the aid of FIGS. 3 and 4 it can be seen, furthermore, that the ventilation device 1, 200 by way of example has a blocking arrangement 21, which by means of blocking ribs 24 arranged on the respective slider 13, 202*a*, 202*b* and/or by means of counter-blocking ribs 27 arranged on the pinion shaft 18, defines an in particular relatively narrow, in particular a 0.1 mm, 0.2 mm, 0.5 mm, 1 mm or 2 mm narrow, sealing gap 23 between the sliders 13, 202*a*, 202*b* and the pinion shaft 18, 215. In so far as mention is made below only of "slider 13, 202*a*, 202*b*", of course all the variants described above are included thereby. In any case, a bypass fluid flow 22 of mixed fluid 11 and/or of cold fluid 5 and/or of hot fluid 8, indicated respectively in FIG. 3 by a dotted line, between the slider 13, 202*a*, 202*b* and the pinion shaft 18, 215 can be reduced or prevented. The mode of operation of the sealing gap 23 is for example like that of a labyrinth seal. Owing to the reduced bypass fluid flow 22 between the slider 13, 202*a*, 202*b* and the pinion shaft 18, 215, acoustic intrusive noises in operation of the ventilation device 1, 200 on the slider 13, 202*a*, 202*b* and/or on the pinion shaft 18, 215 can be reduced or practically completely prevented, for example because a reduced vibratory excitation of the slider 13, 202*a*, 202*b* and/or of the pinion shaft 18, 215 is realized.

The sealing gap 23 can also be seen in particular in FIGS. 2*c* and 2*e*, wherein it is formed, as can be seen, between a free rib edge 25 of a blocking rib 24 and a cylindrical stem body 26, 224 of the pinion shaft 18, 215. Expediently, the pinion shaft 18, 215, the slider 13, 202*a*, 202*b*, the actuation arrangement 47 and the counter-actuation arrangement 48 form between them a clear passage 49, into which the blocking rib 24 and/or the counter-blocking rib 27, proceeding from the slider 13, 202*a*, 202*b* and/or from the pinion shaft 18, 25, project with the formation of the sealing gap 23. It is of course also possible that the sealing gap 23 is formed between a free counter-rib edge 28 of the counter-blocking rib 27 and a slider body 29 of the slider 13, 202*a*, 202*b*.

The blocking arrangement 21 can have a sealing means 30, see in particular FIG. 3, which is arranged by way of example on the counter-blocking rib 27, namely there on its free counter-rib edge 28. The sealing means 30 can cover in a fluid-tight manner the sealing gap 23 formed between slider 13, 202*a*, 202*b* and pinion shaft 18, 215 and thus realize an improved sealing effect. In FIG. 3 it can be seen, furthermore, that the sealing means 30 is realized as an elastic sealing lip 31, which has a root portion 50 arranged in a touching manner on the counter-blocking rib 27, in particular on its free counter-rib edge 28, and a tongue portion 51, which can lie in a touching manner on the blocking rib 24, in particular on its free rib edge 25 or on the slider 13, 202a, 202b. It can be seen furthermore that the tongue portion 51 or respectively the sealing lip 31 is configured to be tapering in the direction towards its free tongue end 52.

A blocking rib 24 or respectively a counter-blocking rib 27 can be formed respectively from a one-piece flat body 32, which has two large areas 33, oriented opposed to one another, and one circumferential end face 34, connecting the large areas 33 with one another, see in particular FIG. 3. In any case, a blocking rib 24 and a counter-blocking rib 27 is arranged parallel to an edge portion 38 of the edge 39 on the slider body 29. By way of example, the blocking ribs 24 are arranged on the slider 13, 202a, 202b so that they protrude from the slider body 29 respectively in an angled manner, in particular at right angles, to the body plane 40.

Furthermore, in particular FIG. 2c shows a sawtooth row, labelled by the reference number 41, of the blocking arrangement 21, which preferably interacts with the blocking rib 24 and/or with the counter-blocking rib 27, in order to counteract the occurrence of intrusive noises in operation of the ventilation device 1, 200. A sawtooth row 41 has several sawteeth 43 or other projection bodies, which are lined up adjacent to one another in a touching manner in stacking direction 42 indicated by a dotted double arrow line in FIG. 2c. The stacking direction 42 is expediently aligned parallel or substantially parallel to the body axis 35. Between the individual sawteeth 43 a tooth gap is respectively formed. The sawteeth 43 and the tooth gaps can interact with the fluid flow in the ventilation device 1, 200 aerodynamically form an acoustic point of view. The tooth gaps are not labelled in closer detail here. In any case, one or more, according to FIG. 2c two, sawtooth rows 41 are arranged on or in the region around the circumferential free edge 39 of the slider body 29 of the slider 13, 202a, 202b, and aligned here respectively parallel to a blocking rib 24 and to a counter-blocking rib 27.

FIG. 5 shows in a sectional view a portion of the pinion shaft 18 of FIG. 2 along its longitudinal axis 20 or respectively in section along a section plane marked by dashed lines, with viewing direction of an arrow V which is marked there. As described above, a bar extension 57 is joined to a free stem end 58 of the stem body 26 of the pinion shaft 16, in particular to an equipping area 59 of the free stem end 58, in the direction of the longitudinal axis 20. The bar extension 57 is configured as a hollow-cylindrical base body 65 with a circular-ring-shaped base cross-section area. The bar extension 57 or respectively its base body 65 can be arranged in a materially bonded and/or force-fitting and/or form-fitting manner on the pinion shaft 18, wherein a cohesive component of bar extension 57 and pinion shaft 18, a one-piece pinion shaft-bar extension component as it were, can be provided in particular by materially bonded connecting. The bar extension 57 lengthens the pinion shaft 18 in the direction of the longitudinal axis 20 towards one side. It is conceivable if the pinion shaft 18 has two free stem ends 58, to mount two bar extensions 57 onto the pinion shaft 18, namely respectively a bar extension 57 on an equipping area 59 of a free stem end 58, in order to thus achieve a lengthening of the pinion shaft 18 in the direction of the longitudinal axis 20 on both sides.

Each bar extension 57 defines along its main extent an axial bar extension longitudinal axis 60. According to FIG. 5 provision is made by way of example to arrange the bar extension 57 on the free end 58 of the pinion shaft 18 so that the bar extension longitudinal axis 60 of the bar extension 57 and the longitudinal axis 20 of the pinion shaft 18 are aligned coaxially to one another. Basically, one can also imagine arranging the bar extension 57 in an angled manner on the pinion shaft 18, so that the bar extension longitudinal axis 60 is aligned in an angled manner to the longitudinal axis 20. In order, for example, the save weight, in particular after a mounting operation of the pinion shaft 18 in the housing 53, provision is made by way of example that between the pinion shaft 18 and the bar extension 57 a predetermined breaking portion 61 is formed. The predetermined breaking portion 61 extends expediently along the equipping areas 59 or is formed by it. The predetermined breaking portion 61 serves to enable, as desired, the complete removal of the bar extension 57 from the pinion shaft 18, for example in which the bar extension 57 is stressed by a predetermined breaking moment, in particular manually by hand or automatically through an automation arrangement, until the predetermined breaking portion 61 yields and a break occurs between bar extension 57 and pinion shaft 18 or respectively the detaching of the bar extension 57 from the pinion shaft 18 occurs. One can imagine realizing the predetermined breaking portion 61 as a cross-section narrowing, wherein at least one single predetermined breaking cross-section 62 of the predetermined breaking portion 61 is configured to be smaller area-wise with respect to each bar extension cross-section 63 of the bar extension 57 and with respect to each pinion shaft cross-section 64 of the pinion shaft 18. Thereby, as it were constructionally a mechanical weak point is established, which enables the removing of the bar extension 57 from the pinion shaft 18. Furthermore, the predetermined breaking portion 61 can be realized as a material weakening portion. Here, the material characteristics of the predetermined breaking portion 61 are decisive for a breaking behaviour or respectively for the removal. The material characteristics of the predetermined breaking portion 61 are expediently realized in a manner promoting predetermined breaking with respect to the material characteristics of the regions of the pinion shaft 18 and of the bar extension 57 immediately surrounding the predetermined breaking portion 61.

According to FIG. 5, it can be seen furthermore that the bar extension 57 has an externally circumferential outer shell surface 66. On the outer shell surface 66, functional elements 67, preferably tooth flanks, can be arranged spaced apart from one another in circumferential direction 19 around the bar extension 57, to which functional elements a tool is able to be applied in a touching manner or to which the actuator 54 indicated partially by dotted lines in FIG. 5 can be drivingly arranged, in particular in order to actuate the pinion shaft 18.

Figures 6, 7:
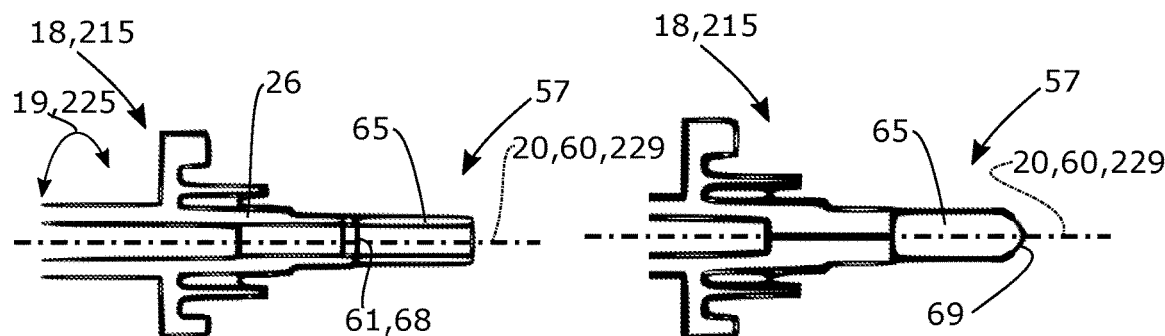

In FIGS. 6 to 9, respectively different variants of a pinion shaft 18 with bar extension 57 can be seen in several sectional views. In FIG. 6, a variant of the pinion shaft 18 with bar extension 57 is illustrated, in which the bar extension 57 has a hollow-cylindrically configured base body 65 with circular base cross-section area, as in FIG. 5. In contrast to the variant of FIG. 5, in the variant of FIG. 6 provision is made to configure the base body 65 of the pinion shaft 18 to be smaller in diameter than the pinion shaft 18 there or respectively its stem body 26. In particular, provision is made to arrange a circumferential groove 68 in circumferential direction 19 in the region around or directly on the predetermined breaking portion 61. The groove 68 can be of v-shaped configuration, viewed in cross-section, wherein the groove base of the groove 68 is expediently configured tapering to a point, so that proceeding from the groove base of the groove 68 a break/tear can be initiated, in order to remove the pinion shaft 18 from the bar extension 57.

In FIG. 7 a variant of the pinion shaft 18 with bar extension 57 can be seen, wherein the base body 65 of the bar extension 57 there is a solid material base body 65. The base body 65 is therefore not configured to be internally hollow, but rather for example is formed entirely from a plastic material or from a composite material. The base body 65 according to FIG. 7 has furthermore at its free end pointing away from the pinion shaft 18 in the direction of the longitudinal axis 20 a single, or a set of insertion faces 69, which are configured in angled manner, in particular in an acute angled manner, with respect to the longitudinal axis 20. For example, the insertion face 69 is configured as a circumferential cylinder shell surface, which forms between it and the longitudinal axis 20 an angle of 10° to approximately 90°. By the insertion faces 69, the inserting of the pinion shaft 18 with bar extension 57 into a recess of the housing 53, expediently within a mounting operation of the pinion shaft 18, can be facilitated.

Figures 8, 9:
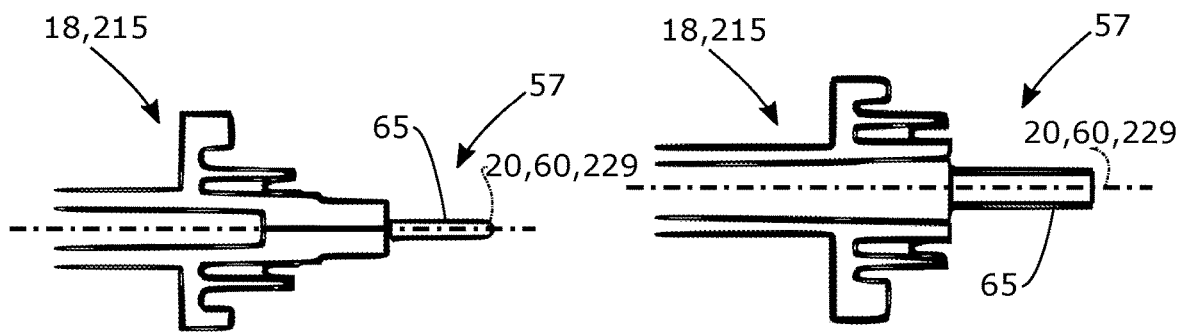

In FIG. 8 a variant of the pinion shaft 18 with bar extension 57 is illustrated, wherein the base body 65 of the bar extension 57 there is a solid material base body. In contrast to the preceding variants, the base body 65 according to FIG. 8 is configured to be thin in diameter in the manner of a pencil lead, in particular 1 mm, 2 mm, 3 mm or 4 mm thin. Thereby, the base body 65 or respectively the bar extension 57 can still be used relatively well as insertion aid within a mounting operation of the pinion shaft 18. Moreover, the base body 65, owing to its thin diameter, can be broken off relatively easily, for example manually by hand, from the pinion shaft 18. In particular, in this variant one can dispense with the formation of a separate predetermined breaking portion 61.

In FIG. 9 a further variant of the pinion shaft 18 with bar extension 57 is illustrated, wherein the base body 65 of the bar extension 57 there is configured hollow-cylindrically.

FIG. 10 shows in a perspective view a preferred further example embodiment of a ventilation device with a slider arrangement. For the sake of simplicity, in the example embodiments functionally identical or functionally similar components are provided with the same reference numbers. A description once again of functionally identical or functionally similar components is not carried out, in order to avoid repetitions. The ventilation device 1 according to FIG. 10 has a slider arrangement 12 with slider 13 and pinion shaft 18, like the slider arrangement 12 according to the above example embodiment. In contrast to the above example embodiment, the ventilation device 1 according to FIGS. 10 to 12 has additionally a clamping arrangement, marked by the reference number 70, which serves for the touching detachable clamping of slider 13 and pinion shaft 18 to one another. For this purpose, the clamping arrangement 70 has been equipped with at least one clamping element 71 arranged on the slider 13 and with at least one counter-clamping element 72 arranged on the pinion shaft 18. The clamping element 71 and the counter-clamping element 72 can be arranged respectively in one piece, therefore integrally, on the slider 13 or respectively on the pinion shaft 18. Alternatively, one can imagine providing the clamping element 71 and the counter-clamping element 72 respectively as a single part and fixing same for example by means of adhesive on the slider 13 or respectively on the pinion shaft 18. In both cases, it is advantageous to use a plastic material or a composite material for the production.

Basically, the clamping arrangement 70 is configured so that the clamping element 71 and the counter-clamping element 72 engage in a touching manner into one another detachably in a form-fitting and/or force-fitting manner, whereby the slider 13 and the pinion shaft 18 clamp immovably to one another. It is conceivable that the clamping element 71 and the counter-clamping element 72 are brought into reciprocal engagement in a linear movement, therefore when clamping element 71 and the counter-clamping element 72 carry out a straight linear movement to one another. It is, however, preferred here if the counter-clamping element 72 is arranged on the pinion shaft 18, whereby within the slider movement 14 it rotates, for actuation of the slider 13, together with the pinion shaft 18 about its longitudinal axis 20 in circumferential direction 19. For the clamping, the clamping element 71 and the counter-clamping element 72 then come into reciprocal engagement in a rotational pivot-rotation movement.

However, both variants have in common the fact that with the engaging into one another of the clamping element 71 and of the counter-clamping element 72 either an elastic widening of the clamping element 71 or an elastic widening of the counter-clamping element 72 takes place, wherein the respectively other element is substantially dimensionally stable, therefore is free of widening and free of compression, see FIG. 12. Furthermore, it can be seen in FIG. 12 that between the clamping elements 71 a clear intermediate clamping gap 85 is formed, into which the counter-clamping body 72 is able to be inserted with lateral widening of the intermediate clamping gap 85 and with elastic deflection of the clamping elements 71 for the clamping to one another of slider 13 and pinion shaft 18. In FIG. 12 the elastic deflecting of the clamping elements 71 is indicated by two arrows.

In particular in FIGS. 10 and 12, it can be seen furthermore that the clamping element 71 has a pair of pin-like clamping fingers 73. Even though it is not illustrated in the FIGS., the counter-clamping element 72 could also be realized as a pair of clamping fingers 73, as a constructional reverse solution, as it were.

The two clamping fingers 73 of the clamping element 71 can protrude respectively in an angled manner, in particular at right angles, from the slider 13 and can be arranged respectively integrally, therefore in one piece, on the slider 13, so that these are securely and undetachably connected with the slider body 29 of the slider 13. According to FIG. 10, two clamping elements 71, spaced apart from one another, form between them an imaginary straight equipping axis 86 indicated in FIG. 10 by means of a dotted line. Along the equipping axis 86 at least two or more clamping fingers 73 are lined up adjacent to one another with a reciprocal distance, in particular in the direction of the equipping axis 86. The equipping axis 86 can be aligned here parallel, in particular substantially parallel, but also in an angled manner, to the longitudinal axis 20 of the pinion shaft 18 or to an edge portion 38 of the edge 39 of the slider body 29, so that the clamping fingers 73 can be distributed, as it were, respectively in a row as desired over the slider 13.

In particular in FIG. 10 it can be seen furthermore that each clamping finger 73 can have a continuously constant finger cross-section 75 with respect to its axial main axial extent 74, which is indicated by way of example by a dashed line. Expediently, the finger cross-section 75 is of round or oval shape.

According to FIGS. 10 and 11 it can be seen furthermore that the counter-clamping element 72 has at least one clamping body 76, fastened integrally on the pinion shaft 18 in an angled manner, in particular at right angles, which clamping body protrudes from the pinion shaft 18 or respectively from its stem body 26. In particular, the clamping body 76 is aligned here in an angled manner, in particular at right angles, with respect to the longitudinal axis 20.

Preferably, the clamping body 76 defines with respect to its main extent 77, which is indicated by a dashed line, a continuously constant clamping body cross-section 78, in particular a round, oval or polygonal clamping body cross-section 78 or, as can be seen in particular in FIG. 12, a continuously T-shaped T-clamping body cross-section 79. In FIGS. 11 and 12 it can be seen in this respect that, in particular the clamping body 76 with T-clamping body cross-section 79, has a base body part 80 and a centring projection 81 arranged thereon for the elastic widening of clamping fingers 73 of a clamping element 71. The centring projection 81 serves as it were for the reciprocal centring of clamping element 71 and counter-clamping element 72, so that a relative movement between slider 13 and pinion shaft 18 is blocked.

It is preferred when the centring projection 81 has a pair of insertion slope faces 82, aligned in an angled, in particular acute-angled, manner to one another. According to FIGS. 10 to 12, two lateral projections 83, 84 are arranged on the base body part 80, which protrude to both sides of the base body part 80 at right angles to the base body part 80. It can be seen, in particular in FIG. 12, that the clamping fingers 73 can lie in a touching manner both on the base body part 80 and also on the lateral projections 83, 84, so that one can at least designate the lateral projections 83, 84 as a stop for one of the clamping fingers 73.

Lastly, FIG. 13 shows in a perspective view a preferred further example embodiment of a slider 13 with protuberance elements 104 for a ventilation device 1. For the sake of simplicity, in the example embodiments functionally identical or functionally similar components are provided with the same reference numbers. A description once again of functionally identical or functionally similar components is not carried out in order to avoid repetitions. The slider 13 according to FIG. 13 can be used for slider arrangements 12 for ventilation device 1. It can be seen that the slider 13 has a substantially cuboid-shaped slider body 29. The slider body 29 extends here along two body axes 35, 36 aligned at right angles to one another, as it were along the length and width. The slider body 29 forms two large slider areas 96, 97 aligned in opposition to one another. In the direction of a body vertical axis 95 aligned transversely to the body axes 35, 36, the slider body 29 is expanded as it were vertically. Expediently, the two large slider areas 96, 97 are connected by means of an end face 98 arranged circumferentially around the slider 13. In particular in FIG. 13 it can be seen that on a large slider area 97 of the slider body 29 two separate longitudinal tooth rows 99 are arranged.

Furthermore, it can be seen in FIG. 13 that each of the longitudinal tooth rows 99 defines a longitudinal tooth axis 100 and that each of the longitudinal tooth rows 99 consists of teeth 101 lined up adjacent to one another in a touching manner in the direction of the respective longitudinal tooth axis 100. Furthermore, each longitudinal tooth row 99 is arranged by way of example directly on the edge 39 or respectively on an edge portion 38 and is expediently aligned here parallel to the respective edge portion 38. Furthermore, the longitudinal tooth rows 99 are aligned parallel to one another and formed with a reciprocal distance, with transverse distance as it were. In FIG. 13, it can be seen furthermore that the teeth 101 of a longitudinal tooth row 99 form in the direction of the respective longitudinal tooth axis 100 tooth crests 102 and tooth troughs 103, which follow one another in an alternating manner. On the tooth crests 102 by way of example respectively a single protuberance element 104 is arranged. The protuberance elements 104 are arranged in operation of the ventilation device 1 in a touching manner between the longitudinal ribs 91, see FIGS. 1a-1c, of a guide arrangement 55 of the ventilation device 1, in order to block a transverse play 93 of the slider 13, indicated by a double arrow, relative to the housing 53 in a transverse direction 94 transversely to the slider movement direction 88. The mentioned longitudinal ribs 91 are a component part of one of at least two guide strips 89 of the guide arrangement 55, see FIGS. 1a-1c and 4. The guide strips 89 are arranged for example in a materially bonded manner and on sides, opposite to one another, of the housing 53. The longitudinal ribs 91 define or form between them a clear slider edge receiving space 92, which serves for the receiving of edge portions 38 of the circumferential edge 39 of the slider 13, so that the latter is able to be guided within the slider movement 14. For this, the longitudinal ribs 91 are equipped with a rib longitudinal axis 90 and with respect thereto are spaced apart from one another, at least partially, transversely, and aligned in a parallel manner, see FIG. 1a.

It must be mentioned in addition that in particular in FIGS. 2a, 2b, 2d a mounting aid arrangement 236 of the ventilation device 1 can be seen, which is arranged on at least one of the two sliders 13, 202a, 202b or on both sliders 13, 202a, 202b. The mounting aid arrangement 236 serves for assisting a mounting operation of the respective slider 13, 202a, 202b on or respectively within the housing 53, 201 and/or on or respectively within the fluid channel system 2. The mounting aid arrangement 236 comprises expediently a single, two, three and preferably four mounting projections 237, which are arranged in a materially bonded or force- and form-fitting manner on the respective slider body 29 of the respective slider 13, 202a, 202b. It has been found that the mounting projections 237 can be preferably configured in a hemispherical or cylinder-shaped manner. In any case, provision is made that within a mounting operation of a slider 13, 202a, 202b by means of an end effector, arranged on a mounting robot which is not illustrated, the mounting projections 237 of the mounting aid arrangement 236 are grasped, in order to hold on to and move the slider 13, 202a, 202b, in particular in order to position the slider 13, 202a, 202b on or respectively within the housing 53, 201 and/or on or respectively within the fluid channel system 2. One can also imagine that the mounting projections 237 of the mounting aid arrangement 236 are grasped by hand or with a hand tool, in order to hold on to and move the slider 13, 202a, 202b. Expediently, all the mounting projections 237 project vertically away from the slider 13, 202a, 202b along a body vertical axis 95 aligned at right angles with respect to the body axes 35, 36 spanning the respective slider 13, 202a, 202b. The mounting projections 237 can be arranged on one of the two large slider areas 96, 97 of a slider body 29 of a slider 13, 202a, 202b.

The invention claimed is:

1. A ventilation device, comprising:
a housing including a fluid channel system;
the fluid channel system including a cold channel for directing a cold fluid flow of a cold fluid, a hot channel for directing a hot fluid flow of a hot fluid, and a mixed channel for directing a mixed fluid flow of a mixed fluid provided from at least one of the cold fluid and the hot fluid;
a heat exchanger arranged within the fluid channel system such that a fluid is flushable around the heat exchanger, the heat exchanger configured to at least one of cool and heat at least one of the cold fluid, the hot fluid, and the mixed fluid;

a slider arrangement including at least one first slider arranged within the fluid channel system upstream of the heat exchanger and movable transversely with respect to at least one of the cold fluid flow, the hot fluid flow, and the mixed fluid flow;

the slider arrangement further including at least one second slider arranged within the fluid channel system downstream of the heat exchanger and movable transversely with respect to at least one of the cold fluid flow, the hot fluid flow, and the mixed fluid flow;

wherein the at least one first slider and the at least one second slider are respectively actuatable within a slider movement in a slider movement direction oriented transversely with respect to at least one of the cold fluid flow, the hot fluid flow, and the mixed fluid flow;

wherein at least one of a volume flow and a mass flow of at least one of the cold fluid flow, the hot fluid flow, and the mixed fluid flow is at least one of controllable and regulatable via actuation of the at least one first slider;

wherein at least one of a predetermined fluid temperature and a predeterminable fluid temperature of the mixed fluid is settable and at least two of the cold fluid, the hot fluid, and the mixed fluid are mixable via actuation of the at least one second slider;

wherein a slider of the at least one first slider and the at least one second slider is movably mounted relative to the fluid channel system via a guide arrangement arranged on the fluid channel system;

wherein the slider includes at least one longitudinal tooth row having a plurality of teeth lined up adjacent to one another; and wherein at least one tooth of the plurality of teeth is disposed in contact with a longitudinal rib of the guide arrangement.

2. The ventilation device according to claim 1, wherein the cold channel, the hot channel, and the mixed channel each includes a wall, and wherein at least one of:

the at least one first slider is movably arranged at least one of (i) within the cold channel on the wall of the cold channel, (ii) within the hot channel on the wall of the hot channel, and (iii) within the mixed channel on the wall of the mixed channel; and the at least one second slider is movably arranged at least one of (i) within the cold channel on the wall of the cold channel, (ii) within the hot channel on the wall of the hot channel, and (iii) within the mixed channel on the wall of the mixed channel.

3. The ventilation device according to claim 1, wherein the at least one first slider has a slider body, and wherein at least one of:

the slider body of the at least one first slider has one of a square plate-shaped flat configuration and a rectangular plate-shaped flat configuration; and the slider body of the at least one first slider has at least one of a c-shaped edge and a u-shaped edge.

4. The ventilation device according to claim 1, wherein the at least one first slider has a slider body, and wherein:

the slider body of the at least one first slider extends along (i) a first body axis extending in a longitudinal direction, (ii) a second body axis extending in a width direction, and (iii) a body vertical axis extending in a vertical direction;

the first body axis and the second body axis are aligned in an angled manner relative to one another;

the body vertical axis is aligned orthogonally to the first body axis and the second body axis;

the slider body is narrower in the vertical direction than in the longitudinal direction and the width direction;

the slider body of the at least one first slider has four margin vertical edges aligned substantially parallel with respect to the body vertical axis and connected with one another via a plurality of margin longitudinal edges aligned substantially parallel to at least one of the first body axis and the second body axis; and two immediately adjacent margin vertical edges of the four margin vertical edges are bent with respect to the first body axis and the second body axis such that the slider body of the at least one first slider has, on two sides opposed to one another, a respective arched edge to facilitate at least one of controlling and regulating the at least one of the volume flow and the mass flow.

5. The ventilation device according to claim 1, wherein:
the at least one first slider has a slider body;
the slider body has an outer circumferential edge; and
the outer circumferential edge forms at least one of a honeycomb-like reinforcement and a labyrinth edge.

6. The ventilation device according to claim 1, wherein:
the at least one first slider has a slider body;
the slider body has an outer circumferential edge; and
the outer circumferential edge has at least one of a plurality of honeycomb-shaped configuration elements and a plurality of box-shaped configuration elements, which reinforce the slider body of the at least one first slider.

7. The ventilation device according to claim 1, wherein:
the at least one first slider has a slider body;
the slider arrangement includes a pinion shaft having a longitudinal axis;
the pinion shaft is drivable rotationally about the longitudinal axis in a circumferential direction, and is arranged in a touching manner on the at least one first slider for actuating the at least one first slider within the slider movement; and
the slider body of the at least one first slider has an actuation arrangement engageable with a counter-actuation arrangement of the pinion shaft.

8. The ventilation device according to claim 1, wherein:
the at least one first slider, within the slider movement, is actuatable to and fro between a hot position, a cold position, and at least one intermediate position;
the at least one first slider, when in the hot position, blocks the cold fluid flow of the cold fluid;
the at least one first slider, when in the cold position, blocks the hot fluid flow of the hot fluid; and
the at least one first slider, when in the at least one intermediate position, partially blocks the cold fluid flow of the cold fluid and the hot fluid flow of the hot fluid.

9. The ventilation device according to claim 1, wherein:
the guide arrangement includes a pair of guide strips arranged opposite one another at least one of on the fluid channel system and on a wall of the fluid channel system, on which opposite edge portions of a circumferential edge of an associated slider of the at least one first slider and the at least one second slider are movably arranged;
the pair of guide strips are each formed by a pair of longitudinal ribs each having a respective rib longitudinal axis;
the pair of longitudinal ribs are spaced apart from one another transversely, at least partially, with respect to their respective rib longitudinal axis, are aligned parallel to one another with respect to their respective rib longitudinal axis, and are arranged on at least one of the fluid channel system and a wall of the fluid channel system, define a slider edge receiving space for receiving an associated edge portion of the opposite edge portions of the associated slider; and at least one edge portion of the opposite edge portions of the associated slider is inserted in a sandwich-like manner between two longitudinal ribs of one of the pairs of longitudinal ribs and into the slider edge receiving space defined therebetween, and lies in a touching and play-free manner on the two longitudinal ribs blocking transverse play of the associated slider relative to the fluid channel system in a transverse direction to the slider movement direction of the associated slider.

10. The ventilation device according to claim 9, wherein:
the slider includes an actuation arrangement interacting with a counter-actuation arrangement arranged on a pinion shaft for actuating the slider within the slider movement;
the actuation arrangement includes the at least one longitudinal tooth row; and
the at least one longitudinal tooth row is arranged at least one of on and in a region of at least one of the circumferential edge and one of the opposite edge portions of the slider and is aligned substantially parallel thereto.

11. The ventilation device according to claim 10, wherein, during operation of the ventilation device, the at least one longitudinal tooth row dips at least partially into the slider edge receiving space.

12. The ventilation device according to claim 10, wherein:
the plurality of teeth define a plurality of tooth crests and a plurality of tooth troughs arranged in an alternating manner in a direction of the longitudinal tooth axis; and
at least one tooth crest of the plurality of tooth crests includes at least one protuberance element projecting away from a tooth of the plurality of teeth transversely to the slider movement direction.

13. The ventilation device according to claim 12, wherein, during operation of the ventilation device, the at least one protuberance element dips at least partially into the slider edge receiving space and lies in a touching manner on one of the two longitudinal ribs.

14. The ventilation device according to claim 12, wherein the at least one protuberance element is at least one of:
arranged integrally on the tooth;
structured as a hemispherical body; and
lies directly on one of the two longitudinal rib in at least one of a punctiform manner, a linear manner, and a flat manner.

15. The ventilation device according to claim 1, wherein:
the slider has a slider body having two large slider areas aligned in opposition to one another;
the slider body extends along (i) a first body axis extending in a length direction, (ii) a second body axis extending in a width direction, and (iii) a body vertical axis extending in a vertical direction;
the first body axis, the second body axis, and the body vertical axis are aligned at right angles relative to one another;
the slider body has an outer circumferential end face connecting the two large slider areas with one another;
the at least one longitudinal tooth row includes two longitudinal tooth rows each having a longitudinal tooth axis, the two longitudinal tooth rows arranged on one of the two large slider areas;

the longitudinal tooth axes of the two longitudinal tooth rows are aligned substantially parallel to one another;
the two longitudinal tooth rows are arranged with a transverse distance to one another with respect to their longitudinal tooth axes;
the two longitudinal tooth rows are arranged at least one of on and in a region of opposite edge portions of the slider; and
the guide arrangement includes a plurality of longitudinal ribs, the plurality of longitudinal ribs including (i) a first longitudinal rib disposed in contact with at least one tooth of a first tooth row of the two longitudinal tooth rows and (i) a second longitudinal rib disposed in contact with at least one tooth of a second tooth row of the two longitudinal tooth rows.

16. A ventilation device, comprising:
a housing including a fluid channel system;
the fluid channel system including a cold channel for directing a cold fluid flow of a cold fluid, a hot channel for directing a hot fluid flow of a hot fluid, and a mixed channel for directing a mixed fluid flow of a mixed fluid provided from at least one of the cold fluid and the hot fluid;
a heat exchanger arranged within the fluid channel system such that a fluid is flushable around the heat exchanger, the heat exchanger configured to at least one of cool and heat at least one of the cold fluid, the hot fluid, and the mixed fluid;
a slider including a tooth row, the slider movably arranged within the fluid channel system and adjustable in a slider movement direction extending transversely to at least one of the cold fluid flow, the hot fluid flow, and the mixed fluid flow;
a pinion shaft including a pinion, the pinion engaged with the tooth row such that rotation of the pinion shaft adjusts the slider in the slider movement direction; and
an acoustic blocking arrangement disposed at least partially between the slider and the pinion shaft, the acoustic blocking arrangement at least partially blocking a bypass fluid flow from flowing between the slider and the pinion shaft.

17. The ventilation device according to claim 16, wherein:
the acoustic blocking arrangement includes a blocking rib arranged on and projecting from one of the slider and the pinion shaft;
a sealing gap is defined between the blocking rib and the other of the slider and the pinion shaft; and
a sealing lip connected to the blocking rib covers the sealing gap when the slider is disposed in at least one position.

18. The ventilation device according to claim 16, wherein:
the acoustic blocking arrangement includes (i) a blocking rib arranged on and projecting from the slider and (ii) a counter-blocking rib arranged on and projecting from the pinion shaft;
a sealing gap is defined between the blocking rib and the counter-blocking rib; and
a sealing lip connected to one of the blocking rib and the counter-blocking rib covers the sealing gap when the slider is disposed in at least one position.

19. The ventilation device according to claim 16, further comprising a second slider, a second pinion shaft, and a second acoustic blocking arrangement, wherein:
the slider is movably arranged within the fluid channel system upstream of the heat exchanger;

the second slider is movably arranged within the fluid channel system downstream of the heat exchanger and is adjustable in the slider movement direction;

the second slider includes a second tooth row;

the second pinion shaft includes a second pinion, the second pinion engaged with the second tooth row such that rotation of the second pinion shaft adjusts the second slider in the slider movement direction;

the second acoustic blocking arrangement is disposed at least partially between the second slider and the second pinion shaft, and at least partially blocks a second bypass fluid flow from flowing between the second slider and the second pinion shaft;

at least one of a volume flow and a mass flow of at least one of the cold fluid flow, the hot fluid flow, and the mixed fluid flow is at least one of controllable and regulatable via actuation of the slider; and at least one of a predetermined fluid temperature and a predeterminable fluid temperature of the mixed fluid is settable and at least two of the cold fluid, the hot fluid, and the mixed fluid are mixable via actuation of the second slider.

20. A ventilation device, comprising:

a housing including a fluid channel system;

the fluid channel system including a cold channel for directing a cold fluid flow of a cold fluid, a hot channel for directing a hot fluid flow of a hot fluid, and a mixed channel for directing a mixed fluid flow of a mixed fluid provided from at least one of the cold fluid and the hot fluid;

a heat exchanger arranged within the fluid channel system such that a fluid is flushable around the heat exchanger, the heat exchanger configured to at least one of cool and heat at least one of the cold fluid, the hot fluid, and the mixed fluid;

a slider including a tooth row, the slider movably arranged within the fluid channel system and adjustable in a slider movement direction extending transversely to at least one of the cold fluid flow, the hot fluid flow, and the mixed fluid flow;

a pinion shaft including a pinion, the pinion engaged with the tooth row such that rotation of the pinion shaft adjusts the slider in the slider movement direction; and a clamping arrangement via which the slider and the pinion shaft are detachably connectable to one another, the clamping arrangement including a clamping element and a complimentary counter-clamping element;

wherein the clamping element is arranged on the slider; and wherein the counter-clamping element is arranged on the pinion shaft and is configured to releasably engage the clamping element.

21. The ventilation device according to claim 20, wherein:

the clamping element includes a pair of elastically deformable clamping fingers between which a clamping gap is defined; and at least a portion of the counter-clamping element is disposed within the clamping gap and elastically deforms the pair of clamping fingers when the clamping element and the counter-clamping element are engaged.

22. The ventilation device according to claim 21, wherein:

the pair of clamping fingers project axially from the slider;

the counter-clamping element has a T-shaped cross-section; and the counter-clamping element includes a centering projection and two lateral stop projections that define the T-shaped cross-section.

23. The ventilation device according to claim 20, wherein:

the slider is adjustable to a hot position, a cold position, and at least one intermediate position;

when the slider is in the hot position, the slider blocks the cold fluid flow of the cold fluid;

when the slider is in the cold position, the slider blocks the hot fluid flow of the hot fluid;

when the slider is in the at least one intermediate position, the slider partially blocks the cold fluid flow of the cold fluid and the hot fluid flow of the hot fluid; and the clamping element and the counter-clamping element are engaged with one another when the slider is at least one of (i) in the hot position and (ii) in the cold position.

24. The ventilation device according to claim 20, further comprising a second slider, a second pinion shaft, and a second clamping arrangement via which the second slider and the second pinion shaft are detachably connectable to one another, wherein:

the slider is movably arranged within the fluid channel system upstream of the heat exchanger;

the second slider is movably arranged within the fluid channel system downstream of the heat exchanger and is adjustable in the slider movement direction;

the second slider includes a second tooth row;

the second pinion shaft includes a second pinion, the second pinion engaged with the second tooth row such that rotation of the second pinion shaft adjusts the second slider in the slider movement direction;

the second clamping arrangement includes a second clamping element and a complimentary second counter-clamping element;

the second clamping element is arranged on the second slider;

the second counter-clamping element is arranged on the second pinion shaft and configured to releasably engage the second clamping element;

at least one of a volume flow and a mass flow of at least one of the cold fluid flow, the hot fluid flow, and the mixed fluid flow is at least one of controllable and regulatable via actuation of the slider; and at least one of a predetermined fluid temperature and a predeterminable fluid temperature of the mixed fluid is settable and at least two of the cold fluid, the hot fluid, and the mixed fluid are mixable via actuation of the second slider.

* * * * *